(12) United States Patent
Yamashita et al.

(10) Patent No.: US 7,879,523 B2
(45) Date of Patent: Feb. 1, 2011

(54) TONER COMPOSITION AND METHOD FOR MANUFACTURING THE TONER COMPOSITION

(75) Inventors: Hiroshi Yamashita, Numazu (JP); Masami Tomita, Numazu (JP); Shigeru Emoto, Numazu (JP); Tsunemi Sugiyama, Numazu (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 12/351,965

(22) Filed: Jan. 12, 2009

(65) Prior Publication Data

US 2009/0155711 A1    Jun. 18, 2009

Related U.S. Application Data

(62) Division of application No. 10/112,769, filed on Apr. 2, 2002, now abandoned.

(30) Foreign Application Priority Data

Apr. 2, 2001    (JP)    ............... 2001-103171

(51) Int. Cl.
     G03G 9/08      (2006.01)
(52) U.S. Cl. .............. 430/137.14; 430/137.19
(58) Field of Classification Search ............ 430/137.14, 430/137.19, 137.1
See application file for complete search history.

(56) References Cited

U.S. PATENT DOCUMENTS

| | | | |
|---|---|---|---|
| 5,079,123 A | 1/1992 | Nanya et al. | |
| 5,418,108 A | 5/1995 | Kmiecik-Lawrynowicz et al. | |
| 5,747,210 A | 5/1998 | Emoto et al. | |
| 5,750,303 A | 5/1998 | Inaba et al. | |
| 5,851,716 A | 12/1998 | Kuramoto et al. | |
| 5,919,595 A | 7/1999 | Mychajlowskij et al. | |
| 5,975,446 A | 11/1999 | Yaguchi et al. | |
| 5,987,291 A | 11/1999 | Masuda | |
| 6,037,090 A | 3/2000 | Tanaka et al. | |
| 6,074,794 A | 6/2000 | Fushimi et al. | |
| 6,103,441 A | 8/2000 | Tomita et al. | |
| 6,140,000 A | 10/2000 | Yamashita | |
| 6,221,549 B1 | 4/2001 | Emoto et al. | |
| 6,248,491 B1 | 6/2001 | Takayanagi et al. | |
| 6,255,028 B1 | 7/2001 | Hasegawa et al. | |
| 6,329,115 B1 | 12/2001 | Yamashita | |
| 6,335,137 B1 | 1/2002 | Suzuki et al. | |
| 6,413,691 B2 | 7/2002 | Daimon et al. | |
| 6,449,451 B2 | 9/2002 | Tsuruya et al. | |
| 6,473,574 B1 | 10/2002 | Usui et al. | |
| 6,596,454 B2 | 7/2003 | Adachi et al. | |
| 2001/0033982 A1 | 10/2001 | Ishikawa et al. | |
| 2004/0259013 A1 | 12/2004 | Ohtani et al. | |
| 2005/0003288 A1 | 1/2005 | Sugiyama et al. | |
| 2005/0036805 A1 | 2/2005 | Murakami et al. | |

FOREIGN PATENT DOCUMENTS

| | | | |
|---|---|---|---|
| EP | 1087265 A1 | | 3/2001 |
| JP | 61-167955 | | 7/1986 |
| JP | 1-267558 | | 10/1989 |
| JP | 02-153361 A | * | 6/1990 |
| JP | 2-173666 | | 7/1990 |
| JP | 3-155568 | | 7/1991 |
| JP | 4-051251 | | 2/1992 |
| JP | 6-282105 | | 10/1994 |
| JP | 07-333890 | | 12/1995 |
| JP | 10-020552 | | 1/1998 |
| JP | 11-007156 | * | 1/1999 |
| JP | 11-231604 | | 8/1999 |
| JP | 2000-347518 | | 12/2000 |
| JP | 2000-352841 | | 12/2000 |
| JP | 2001-51465 | | 2/2001 |
| JP | 2001-66827 | | 3/2001 |

OTHER PUBLICATIONS

Japanese Patent Office machine-assisted translation of JP 11-007156 (pub. Jan. 1999).*
Schaffert, R.M., "Electrophotography", John Wiley & Sons, NY (1975), pp. 27-28 and 601-604.

* cited by examiner

*Primary Examiner*—Janis L Dote
(74) *Attorney, Agent, or Firm*—Oblon, Spivak, McClelland, Maier & Neustadt, L.L.P.

(57) ABSTRACT

A toner composition including toner particles, wherein the toner particles are prepared by a method in which toner constituents including at least a binder resin and a colorant are kneaded upon application of heat to prepare a toner constituent mixture; the toner constituent mixture is dissolved or swelled in an organic solvent capable of dissolving or swelling at least the binder resin to prepare an oil phase liquid; the oil phase liquid is emulsified in an aqueous liquid to prepare an emulsion; the emulsion is coagulated; and then the coagulated emulsion is dried to prepare the toner particles.

12 Claims, 1 Drawing Sheet

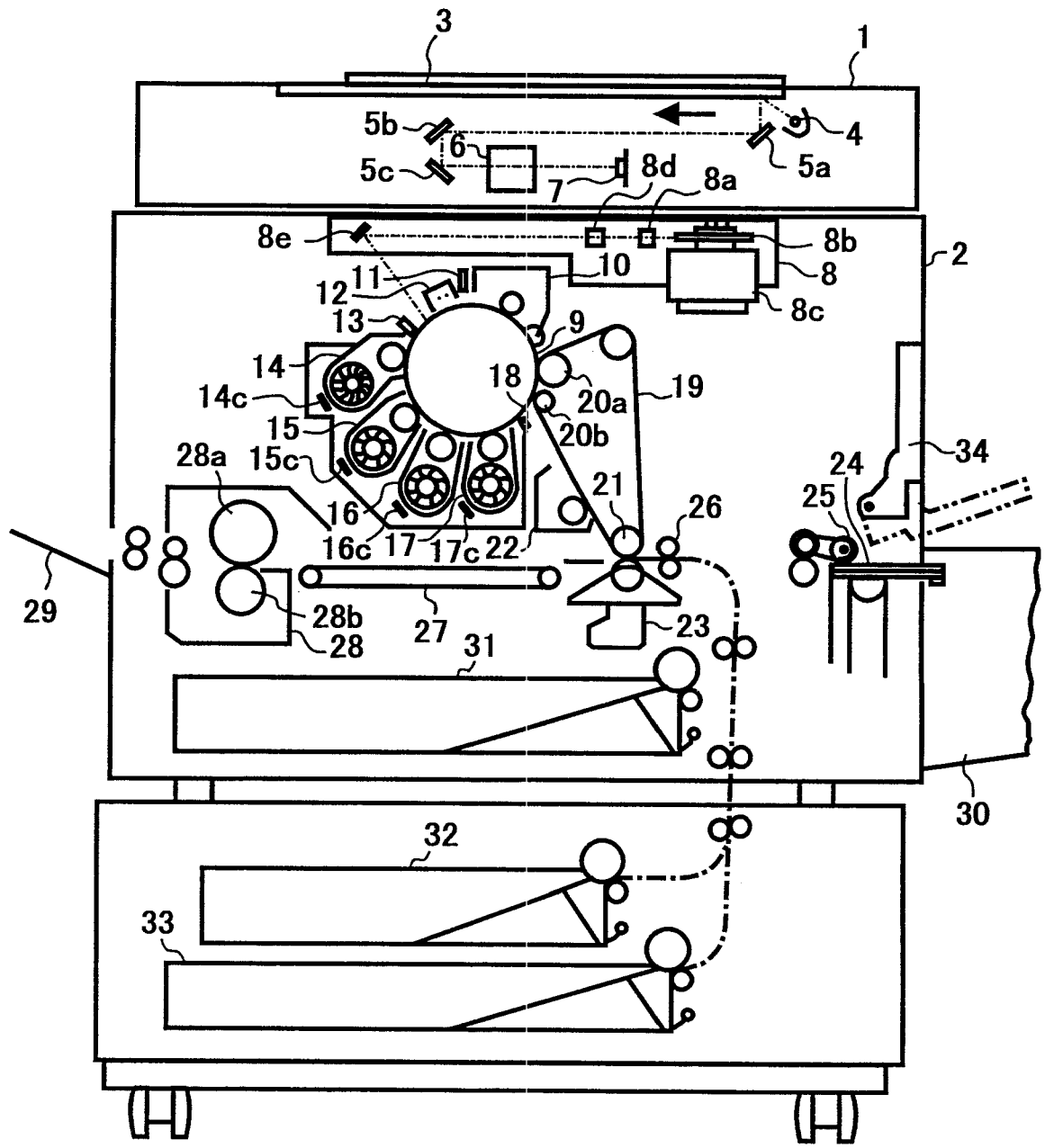

TONER COMPOSITION AND METHOD FOR MANUFACTURING THE TONER COMPOSITION

BACKGROUND OF THE INVENTION

1. Field of the Invention

The present invention relates to a toner composition for use in a developer developing an electrostatic latent image formed by electrophotography, electrostatic recording, electrostatic printing, etc., and to a method for manufacturing the toner composition. More particularly, the present invention relates to a toner composition for use in copiers, laser printers, plain paper facsimile machines, etc., and to a method for manufacturing the toner. In addition, the present invention also relates to a color toner composition for use in full color copiers, full color laser printers, full color facsimile machines, which use a direct or indirect electrophotographic developing method, and to a method for manufacturing the color toner composition.

2. Discussion of the Background

An electrostatic latent image formed on an image bearing member, for example, by electrophotography, electrostatic recording, electroprinting or the like method is developed with a developer to form a visible image (i.e., a toner image) on the image bearing member (developing process). The toner image is then transferred onto a receiving material such as receiving paper optionally via an intermediate transfer medium (transfer process). The toner image on a receiving material is then fixed on the receiving material (fixing process).

As the developer, two-component developers consisting of a carrier and a toner and one-component developers which do not include a carrier and which consists of a magnetic or non-magnetic toner are well known. In a two-component developer, the toner is frictionally charged, for example, by contacting the carrier. In a one-component developer, the toner is frictionally charged by contacting a roller supplying the toner to a developing sleeve, a blade regulating the toner to form a toner layer on the developing sleeve and/or the like member.

In order to prepare high quality images, it has been tried that toners having a small particle diameter and/or a narrow particle diameter distribution are used. When such toners are prepared by a manufacturing method using kneading and pulverizing, the particles of the resultant toners have an irregular form. When such an irregular form toner is used in image forming apparatus, the toner is further pulverized by being agitated together with a carrier, and by contacting a developing roller, toner supplying roller, a toner regulating blade, and a friction-charge applying blade, resulting in formation of toner particles having a very small particle diameter. In addition, a fluidizing agent adhering on the surface of toner particles tends to be embedded into the toner particles, resulting in deterioration of image qualities. Further, since toners having an irregular form have poor fluidity, a large amount of a fluidizing agent has to be added to the toners and thereby image qualities such as background density and fixing property of the resultant toner images are deteriorated and in addition a problem occurs in that the manufacturing costs increase. In addition, when a toner has poor fluidity, the filling factor of the toner deteriorates and thereby a toner bottle in which the toner is filled has to be enlarged in size. Such toners prevent miniaturization of image forming apparatus.

In addition, in full color image forming apparatus, color image transfer processes in which color toner images are transferred onto receiving materials become complex more and more. When toners having an irregular form are used for such full color image forming apparatus, the resultant color images tend to have omissions because the toners have poor transferability. When it is attempted to prevent such image omissions, another problem such that the toner consumption increases tends to occur.

Therefore a need increases for a toner which has so good transferability that high quality images can be formed even when a small amount of the toner is used (i.e., high quality images can be formed at a low running cost). If a toner having good transferability is used, a cleaning unit which is used to remove the toner remaining on the surface of a photoreceptor and an intermediate transfer medium is unnecessary, and therefore the image forming apparatus can be miniaturized and the manufacturing cost thereof can be decreased. In addition, the image forming apparatus has an advantage in that waste toners are not produced. However, in reality it is difficult to perfectly transfer toner images from a photoreceptor or an intermediate transfer medium to a receiving material. Therefore, in reality, toner particles remaining on a photoreceptor or an intermediate transfer medium are removed using a cleaner and the collected toner is reused.

When a spherical toner is used, it is very difficult to remove toner particles remaining on a photoreceptor by a cleaner. Therefore in attempting to provide a toner having a combination of good properties of the toners having an irregular form and good properties of the toners having a spherical form, toners having a slightly deformed spherical form and methods for manufacturing such toners have been proposed.

On the other hand, toner manufacturing methods in which fine toner particles having an irregular form are aggregated to form aggregated toner particles and then the aggregated toner particles are fused to unite the fine toner particles. When the fine particles are prepared by an emulsion polymerization method, resins including units obtained from one or more radically polymerizable monomers such as styrene, acrylic and methacrylic monomers have to be used. However, in view of transparency, flexibility, adhesion to receiving materials, and plasticizer resistance of toner images, it is preferable to use polyester resins and polyol resins as the toner resin. In particular, it is required for full color toners to have good transparency and sharply-melting property. Therefore resin particles obtained by an emulsion polymerization method cannot be used for full color toners.

Japanese Laid-Open Patent Publications Nos. 10-20552 and 11-7156 (hereinafter referred to as JOPs) have disclosed a toner manufacturing method in which a polyester resin solution including a colorant is emulsified in an aqueous liquid and then the particles of the emulsion are coagulated such that the aggregated particles have a toner particle size, and a method in which a fine dispersion of a polyester solution and a fine colorant dispersion are hetero-aggregated.

In general, it is difficult to finely disperse dyes and pigments, which are typically used as colorants, in a solvent which does not dissolve the dyes and pigments. Therefore the resultant toners have poor tinting power. In addition, when hetero aggregation is performed, fine colorant particles in the dispersion do not necessarily aggregate uniformly together with fine resin particles in the dispersion, and it is possible that fine colorant particles aggregate by themselves. Therefore, toners having good tinting power cannot be provided. In addition, when a colorant dispersion is prepared, a large amount of a dispersant is needed and therefore the resultant toner has poor moisture resistance. Further investigation of controlling the dispersion of a charge controlling agent and/or release agent included in a toner has not been performed.

JOP 2-153361 discloses a toner manufacturing method which includes the steps of melting and kneading toner constituents, dissolving (or dispersing) the kneaded mixture in a solvent, and then dispersing the solution (or dispersion) in an aqueous liquid. By using this method, spherical toner particles can be easily manufactured. A colorant such as carbon black can be easily dispersed in a resin by kneading the colorant and the resin upon application of relatively low shear stress. However, when the kneaded mixture is dissolved or dispersed in a solvent, the colorant tends to aggregate again. In addition, it is difficult to disperse organic pigments in a resin when low shear stress is applied. Therefore the resultant color toners have poor coloring property and color reproducibility.

JOP 7-333890 discloses a toner manufacturing method which includes the steps of preparing a master batch colorant by kneading toner constituents, which includes a colorant but not including a binder resin, and a resin which can be mixed with the binder resin upon application of high shear stress; dissolving or dispersing the master batch colorant and a binder resin in an organic solvent; and then dispersing the solution (or dispersion) in an aqueous liquid. However, when the master batch colorant and the binder resin are dissolved or dispersed in an organic solvent, the colorant aggregates therein. Therefore the resultant color toners have poor coloring property and color reproducibility. In addition, other toner constituents such as charge controlling agents and release agents are excessively dispersed in the master batch colorant, and therefore the resultant toner has poor charge property and release property.

Because of these reasons, a need exists for a toner which has good coloring property, color reproducibility, charge properties and releasability.

SUMMARY OF THE INVENTION

Accordingly, an object of the present invention is to provide a toner having good coloring property, color reproducibility, charge properties and releasability.

Another object of the present invention is to provide a method for preparing such a toner.

Briefly these objects and other objects of the present invention as hereinafter will become more readily apparent can be attained by a toner composition including toner particles prepared by a method including the steps of dispersing at least a colorant in a resin to prepare a master batch colorant; kneading the master batch colorant and a binder resin, which may be the same as or different from the resin in the master batch colorant, optionally together with a release agent, a charge controlling agent, etc. upon application of heat; dissolving or dispersing the kneaded mixture in an organic solvent which can dissolve the resin and the binder resin to prepare an oil phase liquid; dispersing the oil phase liquid in an aqueous liquid to prepare an emulsion; coagulating the emulsion before or after optionally removing the organic solvent; and drying the coagulated emulsion, to prepare the toner particles.

The binder resin preferably includes at least one of polyester resins and polyol resins. The master batch colorant preferably includes a wax.

Alternatively, the toner composition can be prepared by a method including the steps of kneading at least a colorant and a binder resin upon application of heat; dissolving (or swelling) the kneaded mixture in an organic solvent to prepare an oil phase liquid; dispersing the oil phase liquid in an aqueous liquid to prepare an emulsion; adding a wax dispersion or a resin dispersion to the emulsion to aggregate the particles of the emulsion.

By using a yellow colorant, a magenta colorant, a cyan colorant or a black colorant as the colorant, full color toners can be provided.

In another aspect of the present invention, a method for manufacturing a toner composition including toner particles, is provided which includes the steps of dispersing at least a colorant in a resin to prepare a master batch colorant; kneading the master batch colorant and a binder resin, which may be the same as or different from the resin in the master batch colorant, optionally together with a release agent, a charge controlling agent, etc. upon application of heat; dissolving and/or dispersing the kneaded mixture in an organic solvent which can dissolve the resin and the binder resin to prepare an oil phase liquid; dispersing the oil phase liquid in an aqueous liquid to prepare an emulsion; removing the organic solvent to prepare toner particle dispersion; and removing the aqueous liquid to prepare toner particles.

Alternatively, it is possible to use a method including the steps of kneading at least a colorant and a binder resin upon application of heat; dissolving (or swelling) the kneaded mixture in an organic solvent to prepare an oil phase liquid; dispersing the oil phase liquid in an aqueous liquid to prepare an emulsion; removing the organic solvent from the emulsion; and optionally aggregating the emulsion, to prepare the toner particles.

By using a yellow colorant, a magenta colorant, a cyan colorant and a black colorant as the colorant, full color toners can be provided.

In yet another aspect of the present invention, an image forming apparatus is provided which includes an image bearer including at least one image bearing member configured to bear an electrostatic latent image; an image developer containing at least one developing section including a developer including a toner, wherein the developing section is configured to develop the electrostatic latent image with the developer to form a toner image on the image bearing member; and an image transfer device configured to transfer the toner image onto a receiving material, wherein the toner is the toner composition of the present invention mentioned above.

The toner may be a one component developer or a two component developer which includes a carrier and the toner. When a one component developer is used, the image developing device preferably has a developing roller and a developing blade which forms a toner layer on the developing roller while controlling the thickness thereof.

The image developer may include plural developing sections each including a different color developer to develop plural latent images formed on the image bearer, resulting in formation of a multi-color or full color image. The image bearer may include plural image bearing members each bearing a different color tone image.

Plural color toner images formed on an image bearing member or plural image bearing members may be transferred onto a receiving material via an intermediate transfer medium.

In one embodiment, the present invention also relates to a method for producing a toner composition, said toner composition comprising toner particles that are fused, and wherein the method is selected from the group consisting of: A) a first method comprising: kneading toner constituents, comprising at least a binder resin and a colorant, upon application of heat, to prepare a toner constituent mixture; dissolving the toner constituent mixture in an organic solvent capable of dissolving at least the binder resin to prepare an oil phase liquid; emulsifying the oil phase liquid in an aqueous liquid to prepare an emulsion; coagulating the emulsion to form an aggregation of particles; heating the coagulated emulsion to fuse the aggregated particles; and isolating the fused toner particles; B) a second method comprising: kneading toner constituents, comprising at least a binder resin and a colorant, upon application of heat, to prepare a toner constituent mixture; swelling the toner constituent mixture in an organic solvent capable of swelling at least the binder resin to prepare an oil phase liquid; emulsifying the oil phase liquid in an aqueous liquid to prepare an emulsion; coagulating the emulsion to form an aggregation of particles; heating the coagulated emulsion to fuse the particles; and isolating the fused toner particles; and C) a third method comprising: kneading, upon application of heat, at least a colorant and a binder resin to prepare a master batch colorant; dispersing toner constituents, comprising at least the master batch colorant and a resin, in an organic solvent capable of dissolving the binder resin and the resin to prepare an oil phase liquid, wherein the resin is the same as the binder resin, or different from the binder resin; emulsifying the oil phase liquid in an aqueous liquid to prepare an emulsion; coagulating the emulsion to form an aggregation of particles; heating the coagulated emulsion to fuse the aggregated particles; and isolating the fused toner particles; wherein a kneader in each of A), B) and C) is selected from the group consisting of single axis continuous kneaders, double-axis continuous kneaders and roll mills.

In another embodiment, the present invention relates to a method as above, wherein the binder resin comprises a styrene-acrylic copolymer.

In yet another embodiment, the present invention relates to a method for manufacturing a toner composition comprising toner particles, comprising: kneading at least a colorant and a binder resin to prepare a master batch colorant; dispersing or swelling toner constituents comprising at least the master batch colorant and a resin in an organic solvent capable of dissolving or swelling at least the binder resin and the resin to prepare an oil phase liquid, wherein the resin is the same as the binder resin or different from the binder resin; emulsifying the oil phase liquid in an aqueous liquid to prepare an emulsion; coagulating the emulsion; drying the coagulated emulsion to prepare the toner particles; and removing the organic solvent from the emulsion after the coagulation step.

These and other objects, features and advantages of the present invention will become apparent upon consideration of the following description of the preferred embodiments of the present invention taken in conjunction with the accompanying drawing.

BRIEF DESCRIPTION OF THE DRAWING

Various other objects, features and attendant advantages of the present invention will be more fully appreciated as the same becomes better understood from the detailed description when considered in connection with the accompanying drawing in which like reference characters designate like corresponding parts throughout and wherein:

FIGURE is a schematic view illustrating the cross section of an image forming apparatus including an embodiment of the image developing device of the present invention.

DETAILED DESCRIPTION OF THE INVENTION

As a result of the present inventors' investigation, it is found that by kneading toner constituents including at least a binder resin and a colorant upon application of heat and then dissolving (or dispersing when the colorant is not dissolved) the kneaded toner constituents in an organic solvent, the dispersion of the toner constituents (particularly the colorant) can be improved. In addition, it is also found that when a toner is prepared by a following emulsifying process in which the solution (or dispersion) is emulsified in an aqueous liquid and which is followed by a coagulation process in which the emulsion is coagulated, the toner has good properties. Thus the present invention is made.

When fine particles of a colorant are dispersed in a binder resin in a kneading process upon application of high shear stress, the surface of the fine particles of the colorant well adsorb a high molecular weight material. The high molecular weight material adsorbed on the fine particles does not release therefrom even if the binder resin is dissolved in an organic solvent. Therefore the thus dispersed fine colorant particles have good dispersion stability. In contrast, when fine colorant particles of a colorant are dispersed in an organic solvent together with a binder resin using a dispersing medium (such as balls of ball mills), the dispersion stability of the fine colorant particles is inferior to that of the fine colorant particles dispersed by the first-mentioned method.

In other words, it is necessary in the present invention that colorant particles are kneaded together with a binder resin upon application of a high shear stress to an extent such that the polymer adsorbed on the surface of the colorant particles remains thereon even when the kneaded mixture is dissolved in an organic solvent after the kneading process.

In addition, the following is discovered. By preparing a colorant master batch in which a colorant is well dispersed in a resin and then kneading the colorant master batch and a resin, which may be the same as or different from the resin in the colorant master batch, optionally together with a release agent, a charge controlling agent, etc. upon application of heat, the resin/colorant ratio increases and thereby the aggregation of the colorant can be prevented when the kneaded mixture is dissolved in an organic solvent. When a colorant master batch is directly dissolved in an organic solvent, the colorant tends to aggregate. In addition, it is found that when the shear stress applied to the mixture in the kneading process is relative low compared to the shear stress applied when the master batch is prepared, the toner constituents other than the colorant are not excessively dispersed (i.e., the toner constituents have a proper dispersion diameter). In particular, when the charge controlling agent included in the kneaded mixture is excessively dispersed, the charge Properties of the resultant toner deteriorate. In addition, when the release agent is excessively dispersed, the releasability of the resultant toner deteriorates.

When it is desired to use a resin which is different from the resin included in a colorant master batch or a resin having a crosslinking component in the toner, the above-mentioned kneading method is preferably used. For example, when a resin which is separated from the resin included in the colorant master batch if the resins are dissolved in an organic solvent is used, this kneading method is preferably used. Namely, when a first resin is kneaded with a colorant master batch including a second resin, the colorant in the colorant master batch adsorbs the first resin, and thereby aggregation of the colorant can be prevented when the kneaded mixture is dissolved in an organic solvent after the kneading process. In addition, an island/sea structure in which the first resin is present like islands in a sea of the second resin or vice versa can be formed in the kneading process, and therefore it is possible to prepare a toner having a combination of the advantages of the resins.

Next, constituents of the toner and developer for use in the present invention and methods for manufacturing the toner and developer will be explained in detail.

Specific examples of the resins for use as the binder resin of the color master batch, the resins added in the kneading process and the resins which are used by being dissolved in an organic solvent, include styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutyl methacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

In the toner of the present invention, polyester resins are preferably used as a binder resin. Specific examples of the polybasic carboxylic acids useful for preparing polyester resins for use in the toner of the present invention include aromatic dicarboxylic acids such as terephthalic acid, isophthalic acid, orthophthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene-2,7-dicarboxylic acid, 5-(sulfophenoxy)isophthalic acid and sulfoterephthalic acid, and their metal salts or ammonium salts; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid and dodecane dicarboxylic acid; unsaturated aliphatic dicarboxylic acids such as fumaric acid, maleic acid, itaconic acid, hexahydrophthalic acid and tetrahydrophthalic acid; alicyclic dicarboxylic acids, etc. In addition, polybasic carboxylic acids such as trimellitic acid, trimesic acid and pyromellitic acid can also be used.

Specific examples of the polyhydric alcohols useful for preparing polyester resins for use in the toner of the present invention include aliphatic alcohols, alicyclic alcohols and aromatic alcohols. Specific examples of the aliphatic alcohols include aliphatic diols such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol and polytetramethylene glycol; triols and tetraols such as trimethylol ethane, trimethylol propane, glycerin and pentaerythritol; etc.

Specific examples of the alicyclic polyhydric alcohols include 1,4-cyclohexanediol, 1,4-cyclohexane dimethanol, spiroglycol, hydrogenated bisphenol A, adducts of hydrogenated bisphenol A with ethylene oxide or propylene oxide, tricyclodecane diol, tricyclodecane dimethanol, etc.

Specific examples of the aromatic polyhydric alcohols include paraxylene glycol, metaxylene glycol, orthoxylene glycol, 1,4-phenylene glycol, adduct-s of 1,4-phenylene glycol with ethylene oxide, bisphenol A, adducts of bisphenol A with ethylene oxide, etc. In addition, lactone type polyester polyols which can be prepared by a ring opening polymerization can also be used.

In order to impart environmental stability to a toner including a polyester resin, an end polar group of the polyester resin is preferably reacted with a monomer having a single functional group. Specific examples of such monomers include monocarboxylic acids such as benzoic acid, chlorobenzoic acid, bromobenzoic acid, parahydroxybenzoic acid, mono ammonium salts of sulfobenzoic acid, mono sodium salts of sulfobenzoic acid, cyclohexylaminocarbonylbenzoic acid, n-dodecylaminocarbonylbenzoic acid, tert-butylbenzoic acid, naphthalenecarboxylic acid, 4-methylbenzoic acid, salicylic acid, thiosalicylic acid, phenylacetic acid, acetic acid, propionic acid, butylic acid, isobutylic acid, octanecarboxylic acid, lauric acid, stearic acid, and their lower alkyl esters; and mono alcohols such as aliphatic alcohols, aromatic alcohols and alicyclic alcohols.

Various kinds of polyol resins can be used in the toner of the present invention. However, it is preferable to use polyol resins which are prepared by reacting an epoxy resin; an adduct of a dihydric phenol with an alkylene oxide or its glycidyl ether; a compound having one active hydrogen therein which can react with the epoxy group of the epoxy resin; and a compound having two or more active hydrogens therein which can react with the epoxy group of the epoxy resin. In addition, as the epoxy resin, two or more kinds of bisphenol A-form epoxy resins each having a different number average molecular weight are preferably used. The thus prepared polyester resins can impart good gloss, transparency and offset resistance to the resultant toner.

Epoxy resins useful for the polyol resin for use in the toner of the present invention are preferably prepared by reacting a bisphenol such as bisphenol A and bisphenol F with epichlorohydrin. In addition, at least two kinds of bisphenol A-form epoxy resins one of which has a relatively low number average molecular weight of from 360 to 2000 and the other of which has a relatively high number average molecular weight of from 3000 to 10000 are preferably used for preparing a polyol resin for use in the toner of the present invention. The contents of the low molecular weight epoxy resin and high molecular weight epoxy resin are preferably from 20 to 50% by weight and from 5 to 40% by weight, respectively.

When the content of the low molecular weight epoxy resin is too high or the molecular weight of the low molecular weight epoxy resin is too low, the resultant toner has too high gloss and/or poor preservability. In contrast, when the content of the high molecular weight epoxy resin is too high or the molecular weight of the high molecular weight epoxy resin is too high, the resultant toner has low gloss and/or poor fixability.

Specific examples of the adducts of a dihydric phenol compound with an alkylene oxide useful for the polyol resins for use in the toner of the present invention include reaction products of ethylene oxide, propylene oxide, butylene oxide or a mixture thereof with a bisphenol compound such as bisphenol A or bisphenol F. The reaction products may be further reacted with epichlorohydrin or β-methylepichlorohydrin to prepare a glycidyl ether compound thereof.

In particular, glycidyl ether compounds of adducts of bisphenol A with an alkylene oxide, which have the following formula, can be preferably used.

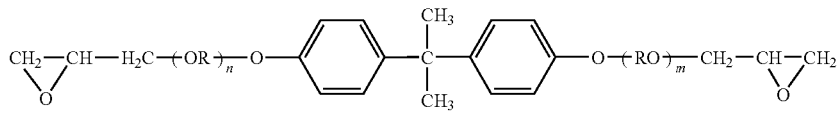

wherein R represents one of the following groups:

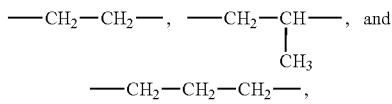

and m and n are independently a positive integer, wherein the total of m and n is from 2 to 6.

In addition, the content of the units obtained from an adduct of a dihydric phenol with an alkylene oxide or its glycidyl ether compound in the polyol resin is preferably from 10 to 40% by weight. When the content is too low, a problem in that the resultant copy sheets curl tends to occur. In contrast, when the content is too high and/or the total of n and m is greater than 7, problems such that the gloss of toner images excessively increases, and/or the preservability of the resultant toner deteriorates tend to occur.

Specific examples of the compounds having one active hydrogen in their molecule, which car react with an epoxy group, and being useful for polyol resins for use in the toner of the present invention include monohydric phenol compounds such as phenol, cresol, isopropyl phenol, aminophenol, octyl phenol, nonyl phenol, dodecyl phenol, and p-cumyl phenol; secondary amines such as diethyl amine, dipropyl amine, dibutyl amine, N-methyl (or ethyl) piperazine, and piperidine; and carboxylic acids such as propionic-acid and caproic acid.

Polyol resins having a main chain which includes an epoxy resin unit and an alkylene oxide unit can be obtained from various combinations of raw materials. For example, an epoxy resin having a glycidyl group on both ends of its molecule; an adduct of a dihydric phenol with an alkylene oxide having a glycidyl group on both ends of its molecule; and a third compound such as dihalides, diisocyanates, diamines, dithiols, polyhydric phenols and dicarboxylic acids, are reacted. Among the third compounds, dihydric phenols are preferable because of having good reaction stability unless they are gelled. In addition, it is preferable to use a polyhydric phenol or a polybasic carboxylic acid together with a dihydric phenol. In this case, the addition quantity of such a polyhydric phenol or polybasic carboxylic acid is preferably not greater than 15% by weight and more preferably not greater than 10% by weight based on total weight of the resultant polyol resin.

Specific examples of the compounds having two or more active hydrogens in their molecule which can react with an epoxy group include dihydric phenols, polyhydric phenols and polybasic carboxylic acids.

Specific examples of the dihydric phenols include bisphenols such as bisphenol A and bisphenol F. Specific examples of polyhydric phenols include onthocresol novolaks, phenol novolaks, tris(4-hydroxyphenyl)methane and 1-[α-methyl-α-(4-hydroxyphenyl)ethyl]benzene. Specific examples of the polybasic carboxylic acids include malonic acid, succinic acid, glutaric acid, adipic acid, maleic acid, fumaric acid, phthalic acid, terephthalic acid, trimellitic acid, and trimellitic anhydride.

When these polyester resins and polyol resins are highly crosslinked, the resultant toner has poor transparency and gloss. Therefore, it is preferable that the polyester resins and polyol resins are not crosslinked or slightly crosslinked such that the resins include components insoluble in tetrahydrofuran in an amount not greater than 5% by weight.

Suitable colorants which are used together with a binder resin in the kneading processor or used in the colorant master batch include know dyes and pigments. Specific examples of the colorants include carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials are used alone or in combination.

The content of the colorant in the toner is preferably from 1 to 20 parts by weight per 100 parts by weight of the binder resin included in the toner. The content of the colorant in the master batch is preferably from 5 to 500 parts by weight per 100 parts by weight of the binder resin included in the master batch.

The toner of the present invention includes a charge controlling agent if desired. Specific examples of the charge controlling agent include known charge controlling agents such as Nigrosine dyes, triphenylmethane dyes, metal complex dyes including chromium, chelate compounds of molybdic acid, Rhodamine dyes, alkoxyamines, quaternary ammonium salts (including fluorine-modified quaternary ammonium salts), alkylamides, phosphor and compounds including phosphor, tungsten and compounds including tungsten, fluorine-containing activators, metal salts of salicylic acid, salicylic acid derivatives, etc.

Specific examples of the marketed products of the charge controlling agents include BONTRON 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd.; copper phthalocyanine, perylene, quinacridone, azo pigments and polymers having a functional group such as a sulfonate group, a carboxyl group, a quaternary ammonium group, etc.

The content of the charge controlling agent in the toner of the present invention depends on the species of the binder resins used, whether or not additives are added to the toner, and the toner manufacturing method used, and therefore the content is not particularly limited. However, the content is typically from 0.1 to 10 parts by weight, and preferably from 0.2 to 5 parts by weight, per 100 parts by weight of the binder resin used. When the content of the charge controlling agent is too high, the charge quantity of the resultant toner excessively increases, resulting in increase of electrostatic attraction between a developing roller and the toner, and thereby the image density of the toner images is decreased.

In the present invention, a charge controlling agent is preferably kneaded with a binder resin while controlling the particle diameter of the charge controlling agent dispersed in the binder resin. When the charge controlling agent used has such a property as to migrate from an oil phase into an aqueous phase when the kneaded mixture is emulsified or release from the kneaded mixture, the charge controlling agent may be added to the aqueous phase. In this case, the charge controlling agent is incorporated in the toner when the emulsion is aggregated or the resultant toner particles are dried.

The toner preferably includes a wax to improve the releasability thereof. Suitable waxes for use in the toner include waxes having a melting point of from 40 to 120° C. and preferably from 50 to 110° C. When the melting point of the wax included in the toner is too high, the low temperature fixability of the resultant toner deteriorates. To the contrary, when the melting point is too low, the offset resistance and durability of the resultant toner deteriorate.

The melting point of waxes (i.e., release agents) can be determined by a method using a differential scanning calorimeter (i.e., DSC). Namely, a few milligrams of a sample is heated at a constant heating speed (for example, 10° C./min) to determine the temperature at which the sample melts (i.e., the temperature at which a peak due to melting of the sample is observed).

Specific examples of the waxes include solid paraffin waxes, microcrystalline waxes, rice waxes, fatty acid amide waxes, fatty acid waxes, aliphatic monoketones, fatty acid metal salt waxes, fatty acid ester waxes, partially-saponified fatty acid ester waxes, silicone varnishes, higher alcohols, carnauba waxes, polyolefins such as low molecular weight polyethylene and polypropylene, and the like waxes. In particular, polyolefins having a softening point of from 70° C. to 150° C., and preferably from 120° C. to 150° C., which is determined by a ring and ball method, are preferable.

It is preferable to knead one or more of these charge controlling agents and release agents together with a colorant and a binder resin or to knead them together with a colorant master batch and a resin, upon application of heat. However, the charge controlling agents and release agents may be added to other toner constituents when the kneaded mixture of the toner constituents is dissolved (or dispersed) in an organic solvent. When this method is adopted, it is preferable to add a fine dispersion of the charge controlling agent and/or release agent to the organic solvent. In order to prepare such a dispersion of charge controlling agent and/or release agent, for example, the following methods can be used:

(1) the agents are dissolved in an organic solvent upon application of heat, and then the solution is cooled to prepare a fine dispersion of the agents; and (2) the agents are mechanically dispersed in an organic solvent using a dispersion machine such as ball mills or the like.

In addition, a wax emulsion which is mentioned below and in which a wax is emulsified in an aqueous liquid using a surfactant or dispersant while being heated and agitated may be added in the coagulation process of the toner constituents together with fine particles of toner constituents.

The thus prepared toner particles can be mixed with an external additive to assist to improve the fluidity, developing ability and charge property of the toner particles. Suitable external additives (hereinafter sometimes referred to as fluidizers) include particulate inorganic materials, which preferably have an average primary particle diameter of from 5 mµ to 2 µm and more preferably from 5 mµ to 500 mµ. In addition, the particulate inorganic materials preferably have a specific surface area of from 20 to 500 m$^2$/g when measured by a BET method. The content of such an external additive in the toner is from 0.01 to 5% by weight, and preferably from 0.01 to 2.0% by weight, based on total weight of the toner.

Specific examples of such inorganic materials include silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, etc.

Particulate polymers can also be used as the external additive. Specific examples of the particulate polymers include polystyrene resins, copolymers of methacrylic esters and/or acrylic esters, etc., which can be obtained by soap-free emulsion polymerization, suspension polymerization or dispersion polymerization; silicone resins, benzoguanamine resins, nylons, etc., which can be obtained by a polycondensation method; and thermo-crosslinked resins.

These fluidizers are preferably subjected to a surface treatment to be hydrophobized. When a hydrophobized fluidizer is used, the fluidity and charge property of the resultant toner can be improved even under high humidity conditions. For example, silane coupling agents, silylation agents, silane coupling agents having a fluoralkyl group, organic titanate coupling agents, aluminum coupling agents, silicone oils, modified silicone oils, etc. can be used as the surface treating agent (i.e., the hydrophobizing agent).

In addition, the toner may include a cleanability improving agent which can impart good cleaning property to the toner such that the toner remaining on the surface of an image bearing member such as a photoreceptor even after a toner image is transferred can be easily removed. Specific examples of such a cleanability improving agent include fatty acids and their metal salts such as stearic acid, zinc stearate and calcium stearate; and particulate polymers such as polymethyl methacrylate and polystyrene, which are manufactured by a method such as soap-free emulsion polymerization methods.

When particulate resins are used, the particulate resins preferably have a relatively narrow particle diameter distribution and a volume average particle diameter of from 0.01 µm to 1 µm.

Method for Manufacturing Toner

Before the kneading operation, toner constituents are preferably mixed uniformly by a mixer. The mixing method is not particularly limited. For example, toner constituents including at least a binder resin and a colorant master batch and optionally a charge controlling agent and a release agent are mechanically mixed using a known mixer having a rotating blade.

After the mixing process, a kneading process is performed in which the mixture is contained in a kneader and kneaded upon application of heat thereto.

Suitable kneaders include kneaders such as single-axis or double-axis continuous kneaders and batch kneaders such as roll mills. Specific examples of the kneaders include KTK double-axis extruders manufactured by Kobe Steel, Ltd., TEM extruders manufactured by Toshiba Machine Co., Ltd., double-axis extruders manufactured by KCK Co., Ltd., PCM double-axis extruders manufactured by Ikegai Corp., and KO-KNEADER manufactured by Buss AG.

In the kneading process, it is important to control the kneading conditions (e.g., kneading temperature) so as not to cut the molecular chains of the binder resin used in the toner or so as not excessively disperse the charge controlling agent and release agent. Specifically, the mixture is kneaded while considering the softening point of the binder resin used and melting point of the release agent used. Namely, when kneading is performed at a temperature much lower than the softening point of the binder resin used, the molecular chains of the binder resin tend to be cut. When the kneading temperature is much higher than the softening point, the charge controlling agent and release agent in the mixture cannot be fully dispersed.

When a colorant master batch is used, the colorant master batch is prepared, for example, by the following method. A resin and a colorant are mixed and kneaded upon application of high shear stress. In this case, an organic solvent can be used to encourage the interaction between the colorant and resin. In addition, a so-called flashing method in which an aqueous cake of a pigment is mixed and kneaded with a resin and an organic solvent to transfer the colorant to the resin phase and then the organic solvent and water are removed therefrom to prepare a mixture of the colorant and resin is also preferably used because a wet cake of a colorant can be used without being dried. When kneading the mixture, kneaders in which high shear stress can be applied, such as three-roll mills, can be preferably used.

Then the kneaded mixture or a combination of the master batch and a resin, and other toner constituents if necessary, are dissolved or dispersed in an organic solvent using an impeller, ball mill, sand mill or homogenizer.

When kneaded mixture is dissolved or dispersed in an organic solvent, it is preferable to use organic solvents which are insoluble, hardly soluble or partially soluble in water and which can dissolve the resin included in the kneaded mixture. For example, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone, etc. can be used. These solvents can be used alone or in combination. Among these solvents, aromatic solvents such as toluene and xylene and halogenated hydrocarbons such as methylene chloride, 1,2-dichloroethane, chloroform and carbon tetrachloride are preferably used.

Then the solution or dispersion is emulsified in an aqueous liquid using an emulsion machine such as HOMOMIXER (manufactured by Tokushu Kika Kogyo Co., Ltd.), EBARA MILDER (manufactured by Ebara Corporation), and KUREAMIX (manufactured by M Technique Co., Ltd.). At this point, by properly controlling the following factors, the particle size and particle diameter distribution of the oil phase of the emulsion can be controlled:

(1) concentration of the emulsifier used;
(2) concentration of the kneaded mixture in the organic solvent;
(3) the weight ratio of the oil phase (i.e., the kneaded mixture and organic solvent) to the aqueous phase (i.e., the aqueous liquid);
(4) the rotation speed of the agitator of the emulsion machine used;
(5) the time of the emulsifying treatment; and etc.

The particle size of the oil phase of the emulsion is preferably controlled so as to be from ½ to ¹/₁₀₀ of the desired toner particle diameter. The weight ratio of the kneaded mixture to the organic solvent is preferable 1/10 to 1/1. The weight ratio of the aqueous phase to the organic phase in the emulsion is preferably from 10/1 to 1/1.

Suitable materials for use in the aqueous liquid include water and organic solvents, which are partially soluble in water, such as alcohols (e.g., methanol and ethanol), ketones (e.g., acetone and methyl ethyl ketone) and esters (e.g., ethyl acetate). Such organic solvents are used together with water.

A dispersant can be preferably used to emulsify an oil phase in which toner constituents are dispersed in an aqueous liquid including water such that the oil phase has a desired particle diameter.

Specific examples of the dispersants include anionic surfactants such as alkylbenzene sulfonic acid salts, α-olefin sulfonic acid salts, and phosphoric acid salts; cationic surfactants such as amine salts (e.g., alkyl amine salts, aminoalcohol fatty acid derivatives, polyamine fatty acid derivatives and imidazoline), and quaternary ammonium salts (e.g., alkyltrimethyl ammonium salts, dialkyldimethyl ammonium salts, alkyldimethyl benzyl ammonium salts, pyridinium salts, alkyl isoquinolinium salts and benzethonium chloride); non-ionic surfactants such as fatty acid amide derivatives, polyhydric alcohol derivatives; and ampholytic surfactants such as alanine, dodecyldi(aminoethyl)glycin, di)octylaminoethyl)glycin, and N-alkyl-N,N-dimethylammonium betaine.

By using a surfactant having a fluoroalkyl group, a dispersion having good dispersibility can be prepared even when a small amount of the surfactant is used. Specific examples of anionic surfactants having a fluoroalkyl group include fluoroalkyl carboxylic acids having from 2 to 10 carbon atoms and their metal salts, disodium perfluorooctanesulfonylglutamate, sodium 3-{omega-fluoroalkyl(C6-C11)oxy}-1-alkyl(C3-C4) sulfonate, sodium 3-{omega-fluoroalkanoyl (C6-C8)-N-ethylamino}-1-propanesulfonate, fluoroalkyl (C11-C20) carboxylic acids and their metal salts, perfluoroalkylcarboxylic acids and their metal salts, perfluoroalkyl(C4-C12)sulfonate and their metal salts, perfluorooctanesulfonic acid diethanol amides, N-propyl-N-(2-hydroxyethyl)perfluorooctanesulfone amide, perfluoroalkyl(C6-

C10)sulfoneamidepropyltrimethylammonium salts, salts of perfluoroalkyl(C6-C10)-N-ethylsulfonyl glycin, monoperfluoroalkyl(C6-C16)ethylphosphates, etc.

Specific examples of the marketed products of such surfactants include SURFLON S-111, S-112 and S-113, which are manufactured by Asahi Glass Co., Ltd.; FRORARD FC-93, FC-95, FC-98 and FC-129, which are manufactured by Sumitomo 3M Ltd.; UNIDYNE DS-101 and DS-102, which are manufactured by Daikin Industries, Ltd.; MEGAFACE F-110, F-120, F-113, F-191, F-812 and F-833 which are manufactured by Dainippon Ink and Chemicals, Inc.; ECTOP EF-102, 103, 104, 105, 112, 123A, 306A, 501, 201 and 204, which are manufactured by Tohchem Products Co., Ltd.; FUTARGENT F-100 and F150 manufactured by Neos; etc.

Specific examples of the cationic surfactants, which can disperse an oil phase including toner constituents in water, include primary, secondary and tertiary aliphatic amines having a fluoroalkyl group, aliphatic quaternary ammonium salts such as perfluoroalkyl(C6-C10)sulfoneamidepropyltrimethylammonium salts, benzalkonium salts, benzetonium chloride, pyridinium salts, imidazolinium salts, etc. Specific examples of the marketed products thereof include SURFLON S-121 (from Asahi Glass Co., Ltd.); FROPARD FC-135 (from Sumitomo 3M Ltd.); UNIDYNE DS-202 (from Daikin Industries, Ltd.); MEGAFACE F-150 and F-824 (from Dainippon Ink and Chemicals, Inc.); ECTOP EF-132 from Tohchem Products Co., Ltd.); FUTARGENT F-300 (from Neos); etc.

In addition, inorganic dispersants, which are hardly soluble in water, such as tricalcium phosphate, calcium carbonate, titanium oxide, colloidal silica, and hydroxyapatite can also be used.

Further, it is possible to stably disperse toner constituents in an aqueous liquid using a polymeric protection colloid. Specific examples of such protection colloids include polymers and copolymers prepared using monomers such as acids (e.g., acrylic acid, methacrylic acid, α-cyanoacrylic acid, α-cyanomethacrylic acid, itaconic acid, crotonic acid, fumaric acid, maleic acid and maleic anhydride), acrylic monomers having a hydroxyl group (e.g., β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethyleneglycolmonoacrylic acid esters, diethyleneglycolmonomethacrylic acid esters, glycerinmonoacrylic acid esters, N-methylolacrylamide and N-methylolmethacrylamide), vinyl alcohol and its ethers (e.g., vinyl methyl ether, vinyl ethyl ether and vinyl propyl ether), esters of vinyl alcohol with a compound having a carboxyl group (i.e., vinyl acetate, vinyl propionate and vinyl butyrate); acrylic amides (e.g., acrylamide, methacrylamide and diacetoneacrylamide) and their methylol compounds, acid chlorides (e.g., acrylic acid chloride and methacrylic acid chloride), and monomers having a nitrogen atom or an alicyclic ring having a nitrogen atom (e.g., vinyl pyridine, vinyl pyrrolidone, vinyl imidazole and ethylene imine).

In addition, polymers such as polyoxyethylene compounds (e.g., polyoxyethylene, polyoxypropylene, polyoxyethylenealkyl amines, polyoxypropylenealkyl amines, polyoxyethylenealkyl amides, polyoxypropylenealkyl amides, polyoxyethylene nonylphenyl ethers, polyoxyethylene laurylphenyl ethers, polyoxyethylene stearylphenyl esters, and polyoxyethylene nonylphenyl esters); and cellulose compounds such as methyl cellulose, hydroxyethyl cellulose and hydroxypropyl cellulose, can also be used as the polymeric protective colloid.

When the organic solvent is removed from the thus prepared emulsion, the emulsion is gradually heated to perfectly evaporate the organic solvent in the oil phase drops, preferably under a reduced pressure. When this organic solvent removing operation is performed under a reduced pressure, the operation can be performed at a relatively low temperature, resulting in prevention of dissolution of the toner constituents such as waxes into the organic solvent and abnormal aggregation of the materials dispersed in the emulsion. This organic solvent removing operation can be performed before or after the coagulation process which is mentioned below. When the organic solvent removing operation is performed before the coagulation process, aggregation of fine particles of the toner constituents can be accelerated.

Alternatively, the emulsion may be subjected to a spraying process. Specifically, the emulsion is sprayed in a dry environment to evaporate the organic solvent in the oil phase drops, resulting in formation of fine toner particles. In this case, the aqueous liquid can also be evaporated. Specific examples of the dry environment include heated gas such as air, nitrogen, carbon dioxide and combustion gases. The temperature of the heated gas is preferably not lower than the highest boiling point of the solvents included in the emulsion. Specific examples of such dryers include spray dryers, belt dryers, rotary kilns, etc.

Then coagulation method of the emulsion will be explained. For example, the following methods can be used as the coagulation method:

(1) an electrolyte is added to the emulsion to thin the electric double layer, resulting in aggregation of fine particles;
(2) a high-molecular-weight water-soluble polymer is added to be adhered on the fine particles, resulting in aggregation of the fine particles;
(3) a material having a charge with a polarity opposite to that of the surfactant or dispersant included in the emulsion is added to the emulsion to neutralize the charge on the surface of the fine particles, resulting in aggregation of the fine particles;
(4) a material is added to the emulsion to change the counter ion of the surfactant or dispersant adhered on the fine particles, resulting in deterioration of the dispersion stability of the fine particles, and thereby the fine particles are aggregated; and
(5) a material is added to the aqueous phase to change the solubility of the surfactant or dispersant included in the aqueous phase, resulting in deterioration of the dispersion stability of the fine particles, and thereby the fine particles are aggregated.

At this point, as mentioned above, a wax emulsion and a particulate resin having a polar group can be added to aggregate the fine particles and to impart good releasability and friction charge properties to the resultant toner particles. When a particulate resin having a relatively high glass transition temperature is added, high temperature preservability of the resultant toner can be improved because a blocking problem in that toner particles are adhered to each other can be avoided.

Specific examples of the materials (coagulants) coagulating the emulsion include electrolytes such as inorganic or organic water-soluble salts (e.g., sodium sulfate, ammonium sulfate, potassium sulfate, magnesium sulfate, sodium phosphate, sodium dihydrogen phosphate, disodium hydrogen phosphate, calcium chloride, cobalt chloride, strontium chloride, cesium chloride, barium chloride, nickel chloride, magnesium chloride, rubidium chloride, sodium chloride, potassium chloride, sodium acetate, ammonium acetate, potassium acetate and sodium benzoate).

The addition quantity of the electrolytes is preferably from 0.01 to 2.0 mol/l, more preferably from 0.1 to 1.0 mol/l and even more preferably from 0.2 to 0.8 mol/l when monovalence electrolyte is used. When a polyvalence electrolyte is used, the addition amount can be decreased compared to the case in which a monovalence electrolyte is used.

When a surfactant is used as a coagulant, the surfactants mentioned above can be used. When a polymer coagulant is used, the polymers mention above for use as the polymeric protective colloid can be used. In this case, polymers having a very high molecular weight can be preferably used.

When a coagulant which is added to the aqueous phase of an emulsion to depress the dispersion stability of the emulsion is used, water-soluble organic compounds such as ethanol, butanol, isopropanol, ethyl cellosolve, butyl cellosolve, dioxane, tetrahydrofuran, aceton and methyl ethyl ketone can be used.

In addition, by heating the coagulated emulsion, fine particles can be fusion-bonded with each other. The aggregated fine particles are sphered due to surface tension thereof, but by controlling the heating temperature (while considering the viscosity of the toner) and the amount of the organic solvent, the size and shape (from spherical shape to irregular shape) of the aggregated toner particles can be controlled.

The thus prepared aggregated emulsion (dispersion) is sprayed in a dry environment to perfectly dry the organic solvent to prepare toner particles. At this point, the aqueous liquid can also be evaporated. Specific examples of the dry environment include heated gas such as air, nitrogen, carbon dioxide and combustion gases. The temperature of the heated gas is preferably not lower than the highest boiling point of the solvents included in the emulsion. Specific examples of such dryers include spray dryers, belt dryers, rotary kilns, etc. Before the drying operation, the coagulated emulsion (dispersion) may be subjected to a solid-liquid separation treatment followed by a washing treatment in which the solid is washed with water. When these operations are repeated, the dispersant and emulsifier used can be removed.

When an acid- or alkali-soluble material such as calcium phosphate is used as a dispersion stabilizer, the resultant particles is preferably subjected to a treatment, in which the material is dissolved by an acid such as hydrochloric acid, and a washing treatment in which the particles are washed with water to remove such a material from the particles. In addition, such a material can be removed using an enzyme.

In general, the thus prepared particles have a narrow particle diameter distribution, and therefore the particles can be used as a toner without being subjected to a further treatment. However, when the thus prepared toner particles have a wide particle diameter distribution even after the particles are subjected to a washing treatment followed by a drying treatment, the toner particles are preferable subjected to a classification treatment using a cyclone, a decanter or a method utilizing centrifuge such that the toner particles have a desired particle diameter distribution. However, it is preferable to perform the classification operation in a liquid having the particles in view of efficiency. The toner particles having an undesired particle diameter can be reused as the raw materials for the kneading process. Such toner particles for reuse may be in a dry condition or a wet condition. At this point, the dispersant used is removed together with the particles having undesired fine particle diameter.

The thus prepared toner particles are then mixed with one or more other particulate materials such as release agents, charge controlling agents, fluidizers and colorants optionally upon application of mechanical impact thereto to fix the particulate materials on the toner particles.

Specific examples of such mechanical impact application methods include methods in which a mixture is mixed with a highly rotated blade and methods in which a mixture is put into a jet air to collide the particles against each other or a collision plate.

Specific examples of such mechanical impact applicators include ONG MILL (manufactured by Hosokawa Micron Co., Ltd.), modified I TYPE MILL in which the pressure of air used for pulverizing is reduced (manufactured by Nippon Pneumatic Mfg. Co., Ltd.), HYBRIDIZATION SYSTEM manufactured by Nara Machine Co., Ltd.), KRYPTRON SYSTEM (manufactured by Kawasaki Heavy Industries, Ltd.), automatic mortars, etc.

Then the developer of the present invention will be explained in detail.

The toner of the present invention can be used for a two-component developer in which the toner is mixed with a magnetic carrier. The weight ratio (T/C) of the toner (T) to the carrier (C) is preferably from 1/100 to 10/100.

Suitable carriers for use in the two component developer include known carrier materials such as iron powders, ferrite powders, magnetite powders, magnetic resin carriers, which have a particle diameter of from about 20 μm to about 200 μm. The surface of the carriers may be coated by a resin.

Specific examples of such resins to be coated on the carriers include amino resins such as urea-formaldehyde resins, melamine resins, benzoguanamine resins, urea resins, and polyamide resins, and epoxy resins. In addition, vinyl or vinylidene resins such as acrylic resins, polymethylmethacrylate resins, polyacrylonitirile resins, polyvinyl acetate resins, polyvinyl alcohol resins, polyvinyl butyral resins, polystyrene resins, styrene-acrylic copolymers, halogenated olefin resins such as polyvinyl chloride resins, polyester resins such as polyethyleneterephthalate resins and polybutyleneterephthalate resins, polycarbonate resins, polyethylene resins, polyvinyl fluoride resins, polyvinylidene fluoride resins, polytrifluoroethylene resins, polyhexafluoropropylene resins, vinylidenefluoride-acrylate copolymers, vinylidenefluoride-vinylfluoride copolymers, copolymers of tetrafluoroethylene, vinylidenefluoride and other monomers including no fluorine atom, and silicone resins.

If desired, an electroconductive powder may be included in the toner. Specific examples of such electroconductive powders include metal powders, carbon blacks, titanium oxide, tin oxide, and zinc oxide. The average particle diameter of such electroconductive powders is preferably not greater than 1 μm. When the particle diameter is too large, it is hard to control the resistance of the resultant toner.

The toner of the present invention can also be used as a one-component magnetic developer or a one-component non-magnetic developer, which does not use a carrier.

Then the electrophotographic image forming method and apparatus will be explained.

In the image forming method (apparatus) of the present invention, a two-component or one-component developer can be used. The image forming apparatus has an image developer having at least a developing section including a developing roller having a magnetic sleeve, a developing roller constituted of an elastic material or a developing roller made of a metal. In addition, the developing section includes a regulating blade which regulates the developer to form a uniform developer layer on the developing roller. When multi-color or full color images are formed, an image developer having plural developing sections each of which has a color developer having a different color toner is used.

An electrostatic latent image formed on a photoreceptor using a charger such as contact changers using an electroconductive brush or roller and an imagewise light irradiator is developed with the developer formed on the developing roller to form a toner image on the photoreceptor. When multi-color or full color images are formed, plural electrostatic latent images formed on different areas of the photoreceptor are developed using the plural developers in the plural developing sections one by one. The thus formed color toner images are transferred on a receiving material one by one, resulting in formation of a multi-color image or a full color image on the receiving material at once.

In this case, the plural electrostatic latent images may be formed on plural photoreceptors. In addition, the color toner images formed on a photoreceptor or plural photoreceptors may be transferred on an intermediate transfer medium to form a multi-color toner image or a full color toner image thereon. The color toner image on the intermediate transfer medium is then transferred on a receiving material.

In the developing process, a reverse development method in which a latent image is developed with a developer having a charge with the same polarity as that of the latent image is preferably used. In addition, a developing method in which a latent image is developed while the developing roller is rotated at a rotation speed faster than that of the photoreceptor is preferably used. In this case, the developing roller contacts or does not contact the photoreceptor.

In the image forming method (apparatus), known image transfer devices using a corotron or a transfer member which presses a receiving material toward the photoreceptor can be used.

The image forming apparatus of the present invention will be explained in detail referring to a drawing.

FIGURE is a schematic view illustrating a cross section of an embodiment of the image forming apparatus of the present invention.

As shown in FIGURE, in a color image reading unit 1 an image of an original 3 is focused on a color sensor 7 using a lamp 4, mirrors 5*a*, 5*b* and 5*c* and lens 6. The image is read by the color sensor 7 while being separated into, for example, a blue (B) image, a green (G) image and a red (R) image, and then the B, G and R images are converted to electric image signals. Then the image signals are subjected to a color conversion treatment by an image processor (not shown) to form black (Bk), cyan (C), magenta (M) and yellow (Y) image data According to the thus prepared color (Bk, C, M and Y) image data, a full color toner image is formed on a receiving material by the following method. A color image forming unit 2 includes a photoreceptor 9 which rotates in the counter-clockwise direction. Around the photoreceptor drum 9, a cleaning unit 10 which includes a pre-cleaning discharger and which cleans the surface of the photoreceptor drum 9; a discharge lamp 11 which discharges charges remaining on the photoreceptor drum 9; a charger 12 which charges the photoreceptor drum 9; a potential sensor 13; a BK image developer 14; a C image developer 15; an M image developer 16; a Y image developer 17; a developing density pattern detector 18; an intermediate transfer medium 19, etc. are arranged.

Each image developer 14, 15, 16 or 17 includes a developing sleeve which rotates to carry a developer such that the developer faces the photoreceptor 9 to develop a latent image on the photoreceptor 9, a paddle which rotates to scoop up and agitate the developer, and a toner concentration detecting sensor (14*c*, 15*c*, 16*c* or 17*c*) which detects the toner concentration in each developer. Each image developer 14, 15, 16 or 17 contains a different color developer.

Then the image forming process will be explained in detail when Bk, C, M and Y images are formed in this order. The developing order is not limited thereto.

When a coping operation is started, the black image data is sent to the color image forming unit 2. An image writing unit 8 converts the black image data to photo signals. According to the photo signals, a laser beam irradiates the photoreceptor drum 9 to form a BK latent image thereon. Numerals 8*a*, 8*b*, 8*c*, 8*d* and 8*e* denote a laser source, a polygon mirror, a case, a lens and a mirror. At this point, the potential of an image area of the latent image is from −80 to −130V and the potential of a non-image area is from −500 to −700V. The developing sleeve of the Bk image developer 14 starts to rotate before the tip of the Bk latent image reaches the developing position in the Bk image developer 14 to develop the Bk latent image with the Bk developer (i.e., the Bk toner). This developing operation is continued until the rear end of the Bk latent image passes the developing position. The Bk image developer 14 achieves a dormant state before the C developing operation is started.

The BK toner image formed on the photoreceptor 9 is transferred onto the intermediate transfer belt 19 which is fed at the same speed as that of the photoreceptor 9. Hereinafter this toner transfer is sometimes referred to as the belt transfer. The intermediate transfer belt 19 is supported by a driving roller 21, a transfer bias roller 20*a*, a ground roller 20*b* and driven rollers while being tensed.

The intermediate transfer belt 19 is typically made of a fluorine-containing resin such as ETFE (ethylene-tetrafluoroethylene copolymer), in which carbon black is dispersed such that the intermediate transfer belt 19 has a volume resistivity not higher than $10^9$ Ω·cm. Specific examples of the transfer bias roller 20*a* include hydrin rubber rollers which are covered with a PFE tube and have a volume resistivity not higher than $10^9$ Ω·cm. Specific examples of the ground roller 20*b* include rollers whose shafts are grounded.

The belt transfer is performed while the photoreceptor 9 is contacted with the intermediate transfer belt 19 and a predetermined bias voltage is applied to the transfer bias roller 20*a*. At this point, the transfer bias roller 20*a* and ground roller 20*b* press the intermediate transfer belt 19 to the photoreceptor 9.

Since the intermediate transfer belt 19 is grounded by the ground roller 20*b*, an electric field is formed by the transfer bias roller 20*a* in the area at which the intermediate transfer belt 19 contacts the photoreceptor 9. Namely, the electric field does not influence on the toner images on the photoreceptor 9 which toner images do not yet contact the intermediate transfer belt 19. Therefore problems in that the distance between toner particles of the toner images widen and voids are formed in the toner images can be prevented.

After the Bk toner image has been transferred on the intermediate transfer belt 19, the photoreceptor 9 is cleaned by the cleaner 10 and then discharged by the discharge lamp 11. Then the photoreceptor is charged again by the charger 12 to form a C latent image.

Then C image data are sent to the color image forming unit 2 and the image writing unit 8 converts the C image data to photo signals to irradiate the photoreceptor 9 with imagewise light. Thus, a C latent image is formed on the photoreceptor 9.

Similarly to the Bk developing process, the C developing section 15 develops the C latent image with the C developer to form a C toner image on the photoreceptor 9. The thus prepared C toner image is then transferred onto a proper position of the Bk toner image on the intermediate transfer belt 19.

The M and Y image developing operations are performed in the similar way as performed in she Bk and C image developing operations. Thus a full color toner image is formed on the intermediate transfer belt 19.

The full color image on the intermediate transfer belt 19 is transferred onto a receiving material by the following method. In FIGURE, a paper transfer unit 23 includes a paper transfer bias roller, a roller cleaning blade, and a belt touch/detach mechanism. The bias roller is ordinarily separated from the intermediate transfer belt 19. When the full color image formed on the intermediate transfer belt 19 are transferred to a receiving material, the receiving material is timely pressed by the belt touch/detach mechanism to transfer the full color image onto the proper position of the receiving material while a bias voltage is applied to the receiving material. Thus, the full color toner image is transferred onto the receiving material.

As shown in FIGURE, a receiving material 24 is timely fed by a feed roller 25, and a registration roller 26 such that the four color images on the intermediate transfer belt 19 can be transferred onto the proper position of the receiving material 24.

As shown in FIGURE, a belt cleaning unit 22 includes a brush roller, a rubber blade, and a belt touch/detach mechanism. When the Bk, C, M and Y toner images are transferred onto the intermediate transfer belt 19, the belt cleaning unit 22 are detached from the intermediate transfer belt 19. After the full color toner image is transferred onto the receiving material 24, the belt cleaning unit 22 is pressed to the intermediate transfer belt 19 by the belt touch/detach mechanism to clean the surface of the intermediate transfer belt 19.

In FIGURE, the receiving material 24 on which the full color toner image has been transferred is fed by a paper feeding unit 27 to a fixer 28. In the fixer 28, the full color toner image on the receiving material 24 is fixed at a nip of a fixing roller 28a which is controlled so as to have a predetermined temperature, and a pressure roller 28b.

In the image forming method (or apparatus), a fixing method in which heat is applied to the toner image by a roller upon application of pressure thereto is preferably used. The temperature of the fixing roller 28a is preferably from 160 to 190° C., and more preferably from 170 to 185° C. In addition, it is preferable to apply a release agent (e.g., silicone oils) on the fixing roller 28a. When setting of the fixing temperature is too low, the fixed toner image tends to have voids because the toner particles are not fully melted. In contrast, when setting of the fixing temperature is too high, heat cannot be fully applied to the fixing roller 28a when copies are continuously produced.

The receiving material 24 having the full color image is then fed to a copy tray 29.

As shown in FIGURE, various sizes of papers are set in paper cassettes 30, 31, 32 and 33. The paper specified by the operation panel (not shown) is fed toward the registration roller 26 from its cassette. Numeral 34 denotes a manual paper feed tray from which an OHP film, a thick paper or the like receiving sheet is manually fed.

The method in which a full color image is formed of four color images (i.e., black, cyan, magenta and yellow images) has been explained. However, if desired, three color images or two color images can be also produced in the same method as mentioned above except that three or two of the image forming operations are performed. When monocolor images are produced, only one of the image developer 14, 15, 16 and 17 achieves an active state (i.e., the ear of the developer is erected) until the copies are completed. The intermediate transfer belt 19 can be forwarded while contacting the surface of the photoreceptor 19. In addition, the copy operation can be performed while the belt cleaner 22 contacts the intermediate transfer belt 19.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Toner Manufacturing Example 1

Preparation of Black Toner

The following components were mixed using a mixer.

| | |
|---|---|
| Styrene-n-butyl acrylate copolymer | 100 |
| (St/nBA of 80:20 by weight, Mn of 23000, Mw/Mn of 5.6 and Tg of 65° C.) | |
| Carbon black | 4.5 |
| (MA60 from Mitsubishi Chemical Corp.) | |
| Pigment Blue 15:3 | 0.5 |
| Charge controlling agent | 2 |
| (BONTRON E-84 from Orient Chemical Co., Ltd.) | |

The mixture was kneaded using a two-roll mill upon application of heat. The kneaded mixture was subjected to roll cooling. The kneaded mixture was dissolved in 200 parts of toluene contained in a tank while agitating with an agitator. Thus a resin solution (or a pigment dispersion) to serve as an oil phase was prepared (hereinafter referred to as an oil phase liquid).

On the other hand, the following components were mixed to prepare an aqueous liquid (i.e., an aqueous phase liquid or a continuous phase liquid).

| | |
|---|---|
| Deionized water | 700 |
| Sodium dodecylbenzenesulfonate | 1 |

The oil phase liquid was added to the aqueous phase liquid while the mixture was agitated with a mixer, HOMOMIXER manufactured by Tokushu Kika Kogyo Co., Ltd. At this point, the rotation speed of the rotor of the mixer was controlled such that the oil phase had a volume average particle diameter of about 1 μm.

Then the mixture was heated to 50° C. under a reduced pressure to remove toluene therefrom. Thus, an emulsion having a dark gray color was prepared. The emulsion was contained in a tank having an impeller and a solution of 10 parts of aluminum sulfate and 90 parts of deionized water was added thereto while the mixture was agitated at a low rotation speed to coagulate the emulsion (i.e., to aggregate the particles). The mixture was heated to 70° C. and the temperature was maintained. The heated mixture was observed using a scanning electron micrometer that the aggregated particles therein were fused and united. Then the mixture was repeatedly subjected to a filtering treatment followed by a washing treatment to prepare a wet cake. Then the wet cake was dried under a reduced pressure. Thus black particles were prepared.

Then 100 parts of the black particles were mixed with 0.5 parts of a hydrophobized silica R972 having a primary particle diameter of 16 nm and manufactured by Nippon Aerosil Co., using a HENSHEL MIXER. The mixture was sieved using a mesh having openings of 50 μm to remove coarse particles.

Thus, a black toner T1-K was prepared.

Preparation of Yellow, Magenta and Cyan Toners

The procedure for preparation of the black toner T1-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T1-Y, a magenta toner T1-M and a cyan toner T1-C were prepared.

Toner Manufacturing Example 2

The procedure for preparation of the black toner T1-K was repeated except that the formulation of the toner was changed as follows:

| | |
|---|---|
| Styrene-n-butyl acrylate copolymer (St/nBA of 80:20 by weight, Mn of 23000, Mw/Mn of 5.6 and Tg of 65° C.) | 100 |
| Carbon black (MA60 from Mitsubishi Chemical Corp.) | 4.5 |
| Pigment Blue 15:3 | 0.5 |
| Charge controlling agent (BONTRON E-84 from Orient Chemical Industries Co., Ltd.) | 2 |
| Carnauba wax | 5 |

Thus, a black toner T2-K was prepared.

Preparation of Yellow, Magenta and Cyan Toners

The procedure for preparation of the black toner T2-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T2-Y, a magenta toner T2-M and a cyan toner T2-C were prepared.

Toner Manufacturing Example 3

Preparation of Black Toner

The following components were contained in a beaker, and mixed using HOMOMIXER.

| | |
|---|---|
| Carnauba wax | 40 |
| Deionized water | 56 |
| Polyethylene glycol nonylphenyl ether | 4 |

The mixture was dispersed by HOMOMIXER while heated to 90° C. to emulsify the wax. Then the wax emulsion was cooled. When the wax emulsion was observed by a scanning electron microscope, the average particle diameter of the wax particles was 0.2 μm.

Then 12.5 parts of the wax emulsion were added to the dark gray emulsion prepared in Example 1 (to which aluminum sulfate was not added) to perform a coagulation treatment.

The mixture was heated to 70° C. and the temperature was maintained. The heated mixture was observed using a scanning electron micrometer that the aggregated particles therein were fused and united. Then the mixture was repeatedly subjected to a filtering treatment followed by a washing treatment to prepare a wet cake. Then the wet cake was dried under a reduced pressure. Thus a black particles were prepared.

Then 100 parts of the black particles were mixed with 0.5 parts of a hydrophobized silica R972 having a primary particle diameter of 16 nm and manufactured by Nippon Aerosil Co., using a HENSHEL MIXER. The mixture was sieved using a mesh having openings of 50 μm to remove coarse particles.

Thus, a black toner T3-K was prepared.

Preparation of Yellow, Magenta and Cyan Toners

The procedure for preparation of the black toner T3-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T3-Y, a magenta toner T3-M and a cyan toner T3-C were prepared.

Toner Manufacturing Example 4

Preparation of Black Toner

The procedure for preparation of the black toner T2-K in Toner Manufacturing Example 2 was repeated except that polymethyl methacrylate particles having an average particle diameter of 0.4 μm (MP1000 from Soken Chemical & Engineering Co., Ltd.) were added to the dark gray emulsion before aluminum sulfate was added thereto.

Thus a black toner T4-K was prepared.

Preparation of Yellow, Magenta and Cyan Toners

The procedure for preparation of the black toner T4-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T4-Y, a magenta toner T4-M and a cyan toner T4-C were prepared.

Toner Manufacturing Example 5

Preparation of Black Toner

The procedure for preparation of the black toner T2-K in Toner Manufacturing Example 2 was repeated except that the styrene-n-butyl acrylate copolymer was replaced with 100 parts of a polyester resin having an acid value of 3, a hydroxyl value of 25, a weight average molecular weight (Mw) of 45000, a Mw/Mn ratio of 4.0 and a glass transition temperature Tg of 60° C.

Thus a black toner T5-K was prepared.

Preparation of Yellow, Magenta and Cyan Toners

The procedure for preparation of the black toner T5-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T5-Y, a magenta toner T5-M and a cyan toner T5-C were prepared.

Toner Manufacturing Example 6

Preparation of Black Toner

The procedure for preparation of the black toner T2-K in Toner Manufacturing Example 2 was repeated except that the styrene-n-butyl acrylate copolymer was replaced with 100 parts of a polyol resin which had been prepared by reacting a dihydric phenol compound with a glycidyl ether compound of an adduct of bisphenol A with an alkylene oxide and which has a weight average molecular weight (Mw) of 40000, a Mw/Mn ratio of 5.3 and a glass transition temperature Tg of 63° C.

Thus a black toner T6-K was prepared.

Preparation of Yellow, Magenta and Cyan Toners

The procedure for preparation of the black toner T6-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T6-Y, a magenta toner T6-M and a cyan toner T6-C were prepared.

Toner Manufacturing Example 7

Comparative Example

Preparation of Black Toner

The procedure for preparation of the black toner T1-K in Toner Manufacturing Example 1 was repeated except that the toner constituents were mixed with toluene and the mixture was dispersed using a ball mill without kneading the toner constituents.

Thus a black toner T7-K was prepared.

Preparation of Yellow, Magenta and Cyan Toners

The procedure for preparation of the black toner T7-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T7-Y, a magenta toner T7-M and a cyan toner T7-C were prepared.

Toner Manufacturing Example 8

Comparative Example

Preparation of Black Toner

The procedure for preparation of the black toner T2-K in Toner Manufacturing Example 2 was repeated except that the toner constituents were mixed with toluene and heated to 70° C. to dissolve the resin and wax in toluene without kneading the toner constituents and then the mixture, which was cooled to precipitate the wax, was dispersed using a ball mill containing zirconia beads to prepare an oil phase liquid.

Thus a black toner T8-K was prepared.

Preparation of Yellow, Magenta and Cyan Toners

The procedure for preparation of the black toner T8-K was repeated except that the colorant (i.e., carbon black and Pigment Blue 15:3) was replaced with 5 parts of Pigment Yellow 17, 5 parts of Pigment Red 57 or 5 parts of Pigment Blue 15:3.

Thus, a yellow toner T8-Y, a magenta toner T8-M and a cyan toner T8-C were prepared.

Master Batch Colorant Manufacturing Example 1

Preparation of Black Color Master Batch

The following components were mixed using a flasher.

| | |
|---|---|
| Water | 1200 |
| Phthalocyanine green aqueous cake (solid content of 30%) | 200 |
| Carbon black (MA60 from Mitsubishi Chemical Corp.) | 540 |

Then 1,200 parts of a polyester resin having an acid value of 3, a hydroxyl value of 25, a weight average molecular weight Mw of 45,000, a Mw/Mn ratio of 4.0, and a glass transition temperature of 60° C. were added to the mixture, and the mixture was kneaded by a two-roll mill at 150° C. for 30 minutes. Then 1,000 parts of xylene were added thereto, and the mixture was further kneaded for 1 hour. After water and xylene were removed therefrom, the residue was cooled by rolling and then pulverized by a pulverizer. Thus a black color master batch MB1-K was prepared.

Preparation of Yellow Color Master Batch

The following components were mixed using a flasher.

| | |
|---|---|
| Water | 600 |
| Pigment yellow aqueous cake (solid content of 50%) | 1200 |

Then 1,200 parts of a polyester resin having an acid value of 3, a hydroxyl value of 25, a weight average molecular weight Mw of 45,000, a Mw/Mn ratio of 4.0, and a glass transition temperature of 60° C. were added to the mixture, and the mixture was kneaded at 150° C. for 30 minutes. Then 1,000 parts of xylene were added thereto, and the mixture was further kneaded for 1 hour. After water and xylene were removed therefrom, the residue was cooled by rolling and then pulverized by a pulverizer. In addition, the pulverized mixture was kneaded by a three-roll mill twice. Thus a yellow color master batch MB1-Y was prepared.

Preparation of Magenta Color Master Batch

The following components were mixed using a flasher.

| | |
|---|---|
| Water | 600 |
| Pigment red 57 aqueous cake (solid content of 50%) | 1200 |

Then 1,200 parts of a polyester resin having an acid value of 3, a hydroxyl value of 25, a weight average molecular weight Mw of 45,000, a Mw/Mn ratio of 4.0, and a glass transition temperature of 60° C. were added to the mixture, and the mixture was kneaded at 150° C. for 30 minutes. Then 1,000 parts of xylene were added thereto, and the mixture was further kneaded for 1 hour. After water and xylene were removed therefrom, the residue was cooled by rolling and then pulverized by a pulverizer. In addition, the pulverized mixture was kneaded by a three-roll mill twice. Thus a yellow color master batch MB1-M was prepared.

Preparation of Cyan Color Master Batch

The following components were mixed using a flasher.

| | |
|---|---|
| Water | 600 |
| Pigment blue 15:3 aqueous cake (solid content of 50%) | 1200 |

Then 1,200 parts of a polyester resin having an acid value of 3, a hydroxyl value of 25, a weight average molecular weight Mw of 45,000, a Mw/Mn ratio of 4.0, and a glass transition temperature of 60° C. were added to the mixture, and the mixture was kneaded at 150° C. for 30 minutes. Then 1,000 parts of xylene were added thereto, and the mixture was further kneaded for 1 hour. After water and xylene were removed therefrom, the residue was cooled by rolling and then pulverized by a pulverizer. In addition, the pulverized mixture was kneaded by a three-roll mill twice. Thus a yellow color master batch MB1-C was prepared.

Master Batch Colorant Manufacturing Example 2

The procedures for preparation of the color master batches MB1-K, MB1-Y, MB1-M and MB1-C were repeated except that the following components were added when the pigment aqueous cake was mixed with water.

| | |
|---|---|
| Carnauba wax | 900 |
| Charge controlling agent | 300 |
| (BONTRON E-84 from Orient Chemical Industries Co., Ltd.) | |

Thus, a black color master batch MB2-K, a yellow color master batch MB2-Y, a magenta color master batch MB2-M and a cyan color master batch MB2-C were prepared.

Toner Manufacturing Example 9

Preparation of Black Toner
The following components were mixed and dispersed in a ball mill containing zirconia beads to prepare an oil phase liquid.

| | |
|---|---|
| Styrene-n-butyl acrylate copolymer | 100 |
| (St/nBA = 80:20 by weight, weight average molecular weight Mw of 23000, Mw/Mn ratio of 5.6 and glass transition temperature of 65° C.) | |
| Black color master batch MB1-K | 12 |
| Charge controlling agent | 2 |
| (BONTRON E-84 from Orient Chemical Industries Co., Ltd.) | |
| Toluene | 200 |

On the other hand, the following components were mixed by an agitator to prepare an aqueous phase liquid.

| | |
|---|---|
| Deionized water | 700 |
| Sodium dodecylbenzensulfonate | 1 |

The above-prepared oil phase was added to the aqueous phase while the mixture was agitated with a mixer, HOMO-MIXER manufactured by Tokushu Kika Kogyo Co., Ltd. At this point, the rotation speed of the rotor of the mixer was controlled such that the oil phase had a volume average particle diameter of about 1 μm.

Then the mixture was heated to 50° C. under a reduced pressure to remove toluene therefrom. Thus, an emulsion having a dark gray color was prepared. The emulsion was contained in a tank having an impeller and a solution of 10 parts of aluminum sulfate dissolved in 90 parts of deionized water was added thereto while the mixture was agitated at a low rotation speed to coagulate the emulsion (i.e., to aggregate the particles). The mixture was heated to 70° C. and the temperature was maintained. The heated mixture was observed using a scanning electron micrometer that the aggregated particles therein were fused and united. Then the mixture was repeatedly subjected to a filtering treatment followed by a washing treatment to prepare a wet cake. Then the wet cake was dried under a reduced pressure. Thus black particles were prepared.

Then 100 parts of the black particles were mixed with 0.5 parts of a hydrophobized silica R972 having a primary particle diameter of 16 nm and manufactured by Nippon Aerosil Co., using a HENSHEL MIXER. The mixture was sieved using a mesh having openings of 50 μm to remove coarse particles.

Thus, a black toner T9-K was prepared.

Preparation of Yellow, Magenta and Cyan Toners
The procedure for preparation of the black toner T9-K was repeated except that the black color master batch MB1-K was replaced with the yellow color master batch MB1-Y, magenta color master batch MB1-M or cyan color master batch MB1-C.

Thus, a yellow toner T9-Y, a magenta toner T9-M and a cyan toner T9-C were prepared.

Toner Manufacturing Example 10

Preparation of Black Toner
The procedure for preparation of the black toner T9-K was repeated except that the formulation of the oil phase liquid was changed to the following.

| | |
|---|---|
| Styrene-n-butyl acrylate copolymer | 100 |
| (St/nBA = 80:20 by weight, weight average molecular weight Mw of 23000, Mw/Mn ratio of 5.6 and glass transition temperature of 65° C.) | |
| Black color master batch MB1-K | 12 |
| Charge controlling agent | 2 |
| (BONTRON E-84 from Orient Chemical Industries Co., Ltd.) | |
| Carnauba wax | 5 |
| Toluene | 200 |

Thus a black toner T10-K was prepared.

Preparation of Yellow, Magenta and Cyan Toners
The procedure for preparation of the black toner T10-K was repeated except that the black color master batch MB1-k was replaced with the yellow color master batch MB1-Y, magenta color master batch MB1-M or cyan color master batch MB1-C.

Thus, a yellow toner T10-Y, a magenta toner T10-M and a cyan toner T10-C were prepared.

Toner Manufacturing Example 11

Preparation of Black Toner
The following components were contained in a beaker, and mixed using HOMOMIXER.

| | |
|---|---|
| Carnauba wax | 40 |
| Deionized water | 56 |
| Polyethylene glycol nonylphenyl ether | 4 |

The mixture was dispersed by HOMOMIXER while heated to 90° C. to emulsify the wax. Then the wax emulsion was cooled. When the wax emulsion was observed by a scanning electron microscope, the average particle diameter of the wax particles was 0.2 μm.

Then 12.5 parts of the wax emulsion were added to the dark gray emulsion prepared in Example 3 (to which aluminum sulfate was not added) to perform a coagulation treatment.

The mixture was heated to 70° C. and the temperature was maintained. The heated mixture was observed using a scanning electron micrometer that the aggregated particles therein were fused and united. Then the mixture was repeatedly subjected to a filtering treatment followed by a washing treatment to prepare a wet cake. Then the wet cake was dried under a reduced pressure. Thus black particles were prepared.

Then 100 parts of the black particles were mixed with 0.5 parts of a hydrophobized silica R972 having a primary particle diameter of 16 nm and manufactured by Nippon Aerosil Co., using a HENSHEL MIXER. The mixture was sieved using a mesh having openings of 50 μm to remove coarse particles.

Thus, a black toner T11-K was prepared.

Preparation of Yellow, Magenta and Cyan Toners

The procedure for preparation of the black toner T11-K was repeated except that the black color master batch MB1-K was replaced with the yellow color master batch MB1-Y, the magenta color master batch MB1-M or the cyan color master batch MB1-C.

Thus, a yellow toner T11-Y, a magenta toner T11-M and a cyan toner T11-C were prepared.

Toner Manufacturing Example 12

Preparation of Black Toner

The procedure for preparation of the black toner T10-K in Toner Manufacturing Example 10 was repeated except that polymethyl methacrylate particles having an average particle diameter of 0.4 μm (MP1000 from Soken Chemical & Engineering Co., Ltd.) were added to the dark gray emulsion before aluminum sulfate was added thereto.

Thus a black toner T12-K was prepared.

Preparation of Yellow, Magenta and Cyan Toners

The procedure for preparation of the black toner T12-K was repeated except that the black color master batch MB1-K was replaced with the yellow color master batch MB1-Y, the magenta color master batch MB1-M or the cyan color master batch MB1-C.

Thus, a yellow toner T12-Y, a magenta toner T12-M and a cyan toner T12-C were prepared.

Toner Manufacturing Example 13

Preparation of Black Toner

The procedure for preparation of the black toner T10-K in Toner Manufacturing Example 10 was repeated except that the styrene-n-butyl acrylate copolymer was replaced with 100 parts of a polyester resin having an acid value of 3, a hydroxyl value of 25, a weight average molecular weight (Mw) of 45000, a Mw/Mn ratio of 4.0 and a glass transition temperature Tg of 60° C.

Thus a black toner T13-K was prepared.

Preparation of Yellow, Magenta and Cyan Toners

The procedure for preparation of the black toner T13-K was repeated except that the black color master batch MB1-K was replaced with the yellow color master batch MB1-Y, the magenta color master batch MB1-M or the cyan color master batch MB1-C.

Thus, a yellow toner T13-Y, a magenta toner T13-M and a cyan toner T13-C were prepared.

Toner Manufacturing Example 14

Preparation of Black Toner

The procedure for preparation of the black toner T10-K in Toner Manufacturing Example 10 was repeated except that the styrene-n-butyl methacrylate copolymer was replaced with a polyol resin which had been prepared by reacting a dihydric phenol compound with a glycidyl ether compound of an adduct of bisphenol A with an alkylene oxide and which has a weight average molecular weight (Mw) of 40000, a Mw/Mn ratio of 5.3 and a glass transition temperature Tg of 63° C.

Thus a black toner T14-K was prepared.

Preparation of Yellow, Magenta and Cyan Toners

The procedure for preparation of the black toner T14-K was repeated except that the black color master batch MB1-K was replaced with the yellow color master batch MB1-Y, the magenta color master batch MB1-M or the cyan color master batch MB1-C.

Thus, a yellow toner T14-Y, a magenta toner T14-M and a cyan toner T14-C were prepared.

Toner Manufacturing Example 15

Preparation of Black Toner

The procedure for preparation of the black toner T9-K in Toner Manufacturing Method 9 was repeated except that the formulation of the oil phase liquid was changed to the following:

| | |
|---|---|
| Polyester resin | 100 |
| (acid value of 3, hydroxyl value of 25, weight average molecular weight (Mw) of 45000, ratio Mw/Mn of 4.0 and glass transition temperature of 60° C.) | |
| Black color master batch MB2-K | 20 |
| Toluene | 200 |

Thus, a black toner T15-K was prepared.

Preparation of Yellow, Magenta and Cyan Toners

The procedure for preparation of the black toner T15-K was repeated except that the black color master batch MB2-K was replaced with the yellow color master batch MB2-Y, the magenta color master batch MB2-M or the cyan color master batch MB2-C.

Thus, a yellow toner T15-Y, a magenta toner T15-M and a cyan toner T15-C were prepared.

Toner Manufacturing Example 16

Comparative Example

Preparation of Black Toner

The procedure for preparation of the black toner T9-K in Toner Manufacturing Method 9 was repeated except that the formulation of the oil phase liquid was changed to the following:

| | |
|---|---|
| Polyester resin | 108 |
| (acid value of 3, hydroxyl value of 25, weight average molecular weight (Mw) of 45000, ratio Mw/Mn of 4.0 and glass transition temperature of 60° C.) | |
| Phthalocyanine green | 0.4 |
| Carbon black | 3.6 |
| (MA60 manufactured by Mitsubishi Chemical Corp.) | |
| Charge controlling agent | 2 |
| (BONTRON E-84 manufactured by Orient Chemical Industries Co., Ltd.) | |
| Carnauba wax | 6 |
| Toluene | 200 |

Thus, a black toner T16-K was prepared. This toner is a comparative toner because of being prepared without a kneading process.

Preparation of Yellow, Magenta and Cyan Toners

The procedure for preparation of the black toner T16-K was repeated except that the colorant (i.e., the combination of phthalocyanine green and carbon black) was replaced with 4 parts of Pigment Yellow 17, 4 parts of Pigment Red 57 or 4 parts of Pigment Blue 15:3.

Thus, a yellow toner T16-Y, a magenta toner T16-M and a cyan toner T16-C were prepared.

Toner Manufacturing Example 17

Comparative Example

Preparation of Black Toner

The following components were mixed using a mixer.

| | |
|---|---|
| Polyester resin (acid value of 3, hydroxyl value of 25, Mn of 45000, Mw/Mn ratio of 4.0 and Tg of 60° C.) | 100 |
| Black color master batch MB1-K | 12 |
| Charge controlling agent (BONTRON E-84 from Orient Chemical Industries Co., Ltd.) | 2 |
| Carnauba wax | 6 |

The mixture was kneaded using a two-roll mill upon application of heat. The kneaded mixture was subjected to roll cooling. The kneaded mixture was dissolved in 200 parts of toluene contained in a tank while agitating with an agitator. Thus an oil phase liquid was prepared.

On the other hand, the following components were mixed to prepare an aqueous phase liquid.

| | |
|---|---|
| Deionized water | 700 |
| Tricalcium phosphate | 35 |
| Sodium dodecylbenzenesulfonate | 1 |

The oil phase liquid was added to the aqueous phase liquid while the mixture was agitated with a mixer, HOMOMIXER manufactured by Tokushu Kika Kogyo Co., Ltd. At this point, the rotation speed of the rotor of the mixer was controlled such that the oil phase had a volume average particle diameter of about 10 μm.

Then the mixture was heated to 50° C. under a reduced pressure to remove toluene therefrom. In addition, concentrated hydrochloric acid was added to dissolve tricalcium phosphate. The dispersion was repeatedly subjected to a washing treatment using water followed by a filtering treatment to prepare a wet cake. Then the wet cake was dried under a reduced pressure. Thus, black toner particles were prepared.

Then 100 parts of the black toner particles were mixed with 0.5 parts of a hydrophobized silica R972 having a primary particle diameter of 16 nm and manufactured by Nippon Aerosil Co., using a HENSHEL MIXER. The mixture was sieved using a mesh having openings of 50 μm to remove coarse particles.

Thus, a black toner T17-K was prepared. This toner is a comparative toner because of being prepared without a coagulation process.

Preparation of Yellow, Magenta and Cyan Toners

The procedure for preparation of the black toner T17-K was repeated except that the black color master batch MB1-K was replaced with MB1-Y, MB1-M or MB1-C.

Thus, a yellow toner T17-Y, a magenta toner T17-M and a cyan toner T17-C were prepared.

Toner Manufacturing Example 18

Comparative Example

Preparation of Black Toner

The procedure for preparation of the black toner T17-K in Toner Manufacturing Example 17 was repeated except that the formulation of the kneaded mixture was changed to the following:

| | |
|---|---|
| Polyester resin (acid value of 3, hydroxyl value of 25, Mn of 45000, Mw/Mn ratio of 4.0 and Tg of 60° C.) | 100 |
| Black color master batch MB2-K | 20 |

Thus, a black color toner T18-K was prepared.

Preparation of Yellow, Magenta and Cyan Toners

The procedure for preparation of the black toner T18-K was repeated except that the black color master batch MB2-K was replaced with MB2-Y, MB2-M or MB2-C.

Thus, a yellow toner T18-Y, a magenta toner T18-M and a cyan toner T18-C were prepared.

Toner Manufacturing Example 19

Comparative Example

Preparation of Black Toner

The procedure for preparation of the black toner T17-K in Toner Manufacturing Example 17 was repeated except that the formulation of the kneaded mixture was changed to the following:

| | |
|---|---|
| Styrene-n-butyl acrylate copolymer (having a St/nBA ratio of 80/20 by weight, weight average molecular weight Mw of 23000, a ratio Mw/Mn of 11.0, glass transition temperature of 65° C. and crosslinked with divinylbenzene) | 100 |
| Black color master batch MB1-K | 12 |
| Charge controlling agent (BONTRON E-84 manufactured by Orient Chemical Industries Co., Ltd.) | 2 |
| Carnauba Wax | 6 |

Thus, a black color toner T19-K was prepared.

Preparation of Yellow, Magenta and Cyan Toners

The procedure for preparation of the black toner T19-K was repeated except that the black color master batch MB1-K was replaced with MB1-Y, MB1-M or MB1-C.

Thus, a yellow toner T19-Y, a magenta toner T19-M and a cyan toner T19-C were prepared.

Toner Manufacturing Example 20

Comparative Example

Preparation of Black Toner

The procedure for preparation of the black toner T17-K in Toner Manufacturing Example 17 was repeated except that the formulation of the kneaded mixture was changed to the following:

| | |
|---|---|
| Polyester resin | 108 |
| (acid value of 3, hydroxyl value of 25, Mn of 45000, Mw/Mn ratio of 4.0 and Tg of 60° C.) | |
| Phthalocyanine green | 0.4 |
| Carbon black | 3.6 |
| (MA60 manufactured by Mitsubishi Chemical Corp.) | |
| Charge controlling agent | 2 |
| (BONTRON E-84 manufactured by Orient Chemical Industries Co., Ltd.) | |
| Carnauba wax | 6 |

Thus, a black color toner T20-K was prepared.

Preparation of Yellow, Magenta and Cyan Toners

The procedure for preparation of the black toner T20-K was repeated except that the colorant (i.e., the combination of phthalocyanine green and carbon black) was replaced with 4 parts of Pigment Yellow 17, 4 parts of Pigment Red 57 or 4 parts of Pigment Blue 15:3.

Thus, a yellow toner T20-Y, a magenta toner T20-M and a cyan toner T20-C were prepared.

Toner Manufacturing Example 21

Comparative Example

Preparation of Black Toner

The procedure for preparation of the black toner T17-K in Toner Manufacturing Example 17 was repeated except that the formulation of the kneaded mixture was changed to the following:

| | |
|---|---|
| Styrene-n-butyl acrylate copolymer | 100 |
| (having a St/nBA ratio of 80/20 by weight, weight average molecular weight Mw of 23000, a ratio Mw/Mn of 11.0, glass transition temperature of 65° C. and crosslinked with divinylbenzene) | |
| Black color master batch MB2-K | 20 |

Thus, a black toner T21-K was prepared.

Preparation of Yellow, Magenta and Cyan Toners

The procedure for preparation of the black toner T21-K was repeated except that the black color master batch MB1-K was replaced with the yellow color master batch MB1-Y, the magenta color master batch MB1-M or the cyan color master batch MB1-C.

Thus, a yellow toner T21-Y, a magenta toner T21-M and a cyan toner T21-C were prepared.

Preparation of Carrier

When each of the above-prepared toners was mixed with a carrier to be evaluated as a two-component developer, a ferrite carrier having an average particle diameter of 50 μm having a surface on which a silicone resin having a thickness of 0.3 μm was formed was used. The two component developer was prepared by mixing 100 parts of the carrier with 5 parts of a toner using a TURBULA mixer to charge the toner.

Evaluation Method (Evaluation Machine A)

Each color developer combination (i.e., a set of a black toner, a yellow toner, a magenta toner and a cyan toner) was set in a full color laser printer IPSIO 5000 manufactured by Ricoh Co., Ltd. In the printer, four color toner images were formed one by one on a belt-shaped photoreceptor using a developing device having four color developing sections each including a different one component color developer. The resultant color toner images were transferred on an intermediate transfer medium one by one to form a full color toner image thereon. The full color toner image was then transferred onto a receiving paper at the same time. The developing method was a reverse developing method.

(Evaluation Machine B)

Each color developer combination was set in a tandem type full color LED printer GL8300 manufactured by Fujitsu Ltd. In the printer, four color toner images were formed on four drum-shaped photoreceptors, respectively, using a developing device having four color developing sections each including a different one component color developer. The developing method was a reverse developing method.

(Evaluation Machine C)

Each color developer combination was set in a full color laser copier Imagio Color 2800 manufactured by Ricoh Co., Ltd. In the copier, four color toner images were formed one by one on a drum-shaped photoreceptor using a developing device having four color developing sections each including a different two component color developer. The developing method was a reverse developing method. The color toner images were transferred one by one onto an intermediate transfer medium to form a full color toner image thereon. The full color toner image was then transferred on a receiving material.

In the evaluation machines A and B, each developing section has a developing roller made of an elastic material and a stainless blade which controls the thickness of the toner layer on the surface of the developing blade (namely, the developing section is a non-magnetic one component developing section).

In addition, the silicone oil applicator which applies a silicone oil to the fixing device was removed from the evaluation machines A, B and C.

A running test in which 10000 copies of an original having an image area of 7% were produced using each color developer combination was performed in each evaluation machine. The following items were evaluated.

(Evaluation Items)

1) Image Density (ID)

Image density of a fixed solid image formed on a receiving paper, TYPE 6000 PAPER from Ricoh Co., Ltd. was measured by a spectrodensitometer X-RITE 938 from X-Rite Co. The averaged image density of four color images is shown in Table 1.

2) Gloss

Gloss of a solid image formed on a receiving paper, TYPE 6000 PAPER from Ricoh Co., Ltd. was measured by a gloss meter from Nippon Denshoku Kogyo K.K. while the incident angle was set to be 60°. The higher the gloss, the glossier the image. In general, full color images having a proper gloss are desired by users.

3) Charge Quantity (Q/M) after Running Test

When a one component developer was used, the charge quantity of the developer was determined as follows:
(a) the developer on the developing roller was collected by sucking when the developer develops a solid image;
(b) the charge quantity of the collected developer was measured by a Q meter; and
(c) a ratio (Q/M) of the charge quantity (Q) to the weight (M) of the collected developer is determined.

The averaged charge quantity (Q/M) of a combination of four color developers is shown in Table 1.

When a two component developer was used, the developer was sampled after the running test and then the charge quantity thereof was measured by the following blow-off method:
(a) airing the sampled developer with compressed air to separate the toner from the carrier of the developer;
(b) the charge quantity of the toner is measured by a Q meter;
(c) a ratio Q/M of the charge quantity (Q) to the weight (M) of the toner is determined.

The unit of the charge quantity is $-\mu C/g$.

4) Fixable Temperature Range ($\Delta T$)

After the running test, each of the evaluation machines A, B and C was modified such that the temperature of the fixing unit can be changed. A stripe black toner image in which four color images are overlaid was formed and fixed while the temperature of the fixer was changed, to determine the lower and upper limit of the fixable temperature of the toner image. In this case, the silicone oil applicator was not used. The difference between the upper fixable temperature and the lower fixable temperature, which is the fixable temperature range, is shown in Table 1.

The lower fixable temperature was defined as the minimum temperature of the temperature range in which the toner image can be fixed without causing a chipping problem when the toner image is subjected to a spiral scoring test. The upper fixable temperature was defined as the maximum temperature of the temperature range in which the toner image could be fixed without causing a hot offset problem.

The results are shown in Table 1.

TABLE 1

| | Developer | Evaluation machine | ID | Gloss (%) | Q/M (−μC/g) | ΔT (° C.) |
|---|---|---|---|---|---|---|
| Ex. 1 | T1-YMCK | A | 1.84 | 15 | 36 | 25 |
| Ex. 2-1 | T2-YMCK | A | 1.90 | 18 | 38 | 95 |
| Ex. 2-2 | T2-YMCK | B | 2.01 | 21 | 22 | 95 |
| Ex. 2-3 | T2-YMCK | C | 1.75 | 19 | 28 | 100 |
| Ex. 3 | T3-YMCK | A | 1.82 | 15 | 34 | 90 |
| Ex. 4 | T4-YMCK | A | 1.90 | 20 | 40 | 120 |
| Ex. 5 | T5-YMCK | A | 2.10 | 35 | 33 | 90 |
| Ex. 6 | T6-YMCK | A | 2.15 | 38 | 30 | 85 |
| Comp. Ex. 1 | T7-YMCK | A | 1.15 | 8 | 15 | 30 |
| Comp. Ex. 2 | T8-YMCK | A | 1.23 | 6 | 11 | 35 |
| Ex. 7 | T9-YMCK | A | 3.17 | 28 | 34 | 30 |
| Ex. 8-1 | T10-YMCK | A | 3.22 | 33 | 39 | 100 |
| Ex. 8-2 | T10-YMCK | B | 3.26 | 36 | 21 | 105 |
| Ex. 8-3 | T10-YMCK | C | 2.95 | 34 | 30 | 100 |
| Ex. 9 | T11-YMCK | A | 3.09 | 31 | 35 | 65 |
| Ex. 10 | T12-YMCK | A | 3.20 | 35 | 40 | 130 |
| Ex. 11 | T13-YMCK | A | 3.58 | 64 | 31 | 95 |
| Ex. 12 | T14-YMCK | A | 3.63 | 70 | 32 | 90 |
| Ex. 13 | T15-YMCK | A | 2.87 | 26 | 17 | 60 |
| Comp. Ex. 3 | T16-YMCK | A | 0.71 | 10 | 29 | 95 |
| Comp. Ex. 4 | T17-YMCK | A | 1.96 | 15 | 35 | 45 |
| Comp. Ex. 5 | T19-YMCK | A | 1.91 | 5 | 38 | 85 |
| Comp. Ex. 6 | T17-YMCK | B | 2.03 | 18 | 25 | 55 |
| Comp. Ex. 7 | T19-YMCK | B | 1.89 | 8 | 28 | 100 |
| Comp. Ex. 8 | T18-YMCK | A | 1.74 | 13 | 8 | 20 |
| Comp. Ex. 9 | T20-YMCK | A | 1.15 | 16 | 15 | 30 |
| Comp. Ex. 10 | T21-YMCK | A | 1.62 | 7 | 11 | 35 |

As can be under stood from Table 1, the resultant toner has good tinting power and color reproducibility, and maintains good charge properties even when used for a long period of time because the toner constituents including a binder resin and a colorant are kneaded upon application of heat.

When a polyester resin or a polyol resin is used as the binder resin, the resultant toner further has good fixability and a releasability.

The toner of the present invention can be preferably used as a one component developer or for a two component developer.

This document claims priority and contains subject matter related to Japanese Patent Application No. 2001-103847, filed on Apr. 2, 2001, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by letters patents of the united states is:

1. A method for producing a toner composition, said toner composition comprising toner particles that are fused, and wherein the method is selected from the group consisting of:
A) a first method comprising:
  kneading toner constituents, comprising at least a binder resin and a colorant, upon application of heat, to prepare a toner constituent mixture;
  dissolving the toner constituent mixture in an organic solvent capable of dissolving at least the binder resin to prepare an oil phase liquid;
  emulsifying the oil phase liquid in an aqueous liquid to prepare an emulsion;
  coagulating the emulsion to form an aggregation of particles;
  heating the coagulated emulsion to fuse the aggregated particles; and
  isolating the fused toner particles;
B) a second method comprising:
  kneading toner constituents, comprising at least a binder resin and a colorant, upon application of heat, to prepare a toner constituent mixture;
  swelling the toner constituent mixture in an organic solvent capable of swelling at least the binder resin to prepare an oil phase liquid;
  emulsifying the oil phase liquid in an aqueous liquid to prepare an emulsion;
  coagulating the emulsion to form an aggregation of particles;
  heating the coagulated emulsion to fuse the particles; and
  isolating the fused toner particles; and C) a third method comprising:
- kneading, upon application of heat, at least a colorant and a binder resin to prepare a master batch colorant;
- dispersing toner constituents, comprising at least the master batch colorant and a resin, in an organic solvent capable of dissolving the binder resin and the resin to prepare an oil phase liquid, wherein the resin is the same as the binder resin, or different from the binder resin;
- emulsifying the oil phase liquid in an aqueous liquid to prepare an emulsion;
- coagulating the emulsion to form an aggregation of particles;
- heating the coagulated emulsion to fuse the aggregated particles; and
- isolating the fused toner particles;
- wherein a kneader in each of A), B) and C) is selected from the group consisting of single axis continuous kneaders, double-axis continuous kneaders and roll mills.

2. The method according to claim 1, wherein the binder resin comprises a polyester resin.

3. The method according to claim 1, wherein the binder resin comprises a polyol resin.

4. The method according to claim 1, wherein the binder resin comprises a styrene-acrylic copolymer.

5. The method according to claim 1, wherein the toner constituents further comprise a wax having a melting point of from 50° C. to 120° C.

6. The method according to claim 1, wherein the colorant is selected from the group consisting of yellow, magenta, cyan and black colorants.

7. A method for manufacturing a toner composition comprising toner particles, comprising:
- kneading toner constituents comprising at least a binder resin and a colorant upon application of heat to prepare a toner constituent mixture;
- dissolving or swelling the toner constituent mixture in an organic solvent capable of dissolving or swelling at least the binder resin to prepare an oil phase liquid;
- emulsifying the oil phase liquid in an aqueous liquid to prepare an emulsion;
- coagulating the emulsion; and
- drying the coagulated emulsion to prepare the toner particles.

8. The method according to claim 7, further comprising:
removing the organic solvent from the emulsion before the coagulation step.

9. The method according to claim 7, further comprising:
removing the organic solvent from the emulsion after the coagulation step.

10. The method according to claim 7, wherein the colorant is selected from the group consisting of yellow, magenta, cyan and black colorants.

11. A method for manufacturing a toner composition comprising toner particles, comprising:
- kneading at least a colorant and a binder resin to prepare a master batch colorant;
- dispersing or swelling toner constituents comprising at least the master batch colorant and a resin in an organic solvent capable of dissolving or swelling at least the binder resin and the resin to prepare an oil phase liquid, wherein the resin is the same as the binder resin or different from the binder resin;
- emulsifying the oil phase liquid in an aqueous liquid to prepare an emulsion;
- coagulating the emulsion;
- drying the coagulated emulsion to prepare the toner particles; and
- removing the organic solvent from the emulsion after the coagulation step.

12. The method according to claim 11, wherein the colorant is selected from the group consisting of yellow, magenta, cyan and black colorants.

* * * * *